US012477323B2

(12) United States Patent
Padova et al.

(10) Patent No.: US 12,477,323 B2
(45) Date of Patent: Nov. 18, 2025

(54) DYNAMIC BOOTSTRAP eSIM MANAGEMENT FOR A WIRELESS DEVICE

(71) Applicant: Apple Inc., Cupertino, CA (US)

(72) Inventors: Jean-Marc Padova, San Francisco, CA (US); Li Li, Los Altos, CA (US); Viswanath Nagarajan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 477 days.

(21) Appl. No.: 18/166,433

(22) Filed: Feb. 8, 2023

(65) Prior Publication Data

US 2024/0267722 A1 Aug. 8, 2024

(51) Int. Cl.
*H04W 8/20* (2009.01)
*H04W 8/18* (2009.01)
*H04W 12/30* (2021.01)

(52) U.S. Cl.
CPC .......... *H04W 8/205* (2013.01); *H04W 8/183* (2013.01); *H04W 12/35* (2021.01)

(58) Field of Classification Search
CPC ...... H04W 8/205; H04W 8/183; H04W 12/35
See application file for complete search history.

(56) References Cited

U.S. PATENT DOCUMENTS

| 11,523,269 | B2* | 12/2022 | Bouskila | ............... H04W 8/183 |
| 2017/0026823 | A1* | 1/2017 | Mohammed | ............ H04W 8/26 |
| 2020/0178070 | A1* | 6/2020 | Yang | ..................... H04W 8/245 |
| 2022/0326959 | A1* | 10/2022 | Lee | .......................... G06F 8/61 |

\* cited by examiner

*Primary Examiner* — Dhaval V Patel
(74) *Attorney, Agent, or Firm* — DICKINSON WRIGHT RLLP

(57) ABSTRACT

This application describes managing configuration of a bootstrap electronic SIM (eSIM) for a wireless device. A bootstrap eSIM on an embedded universal integrated circuit card (eUICC) of the wireless device is configured as needed to provide cellular wireless access. The bootstrap eSIM is configured with an initial international mobile subscriber identity (i-IMSI) value used to establish a cellular connection to obtain a bootstrap IMSI (b-IMSI) value allocated for temporary, dedicated use by the wireless device. The b-IMSI value is selected by a bootstrap server based on a bootstrap selection rule obtained from a bootstrap rules service, where the bootstrap selection rule accounts for a use case type provided by the wireless device and indicating a purpose for use of the b-IMSI value. The b-IMSI value is returned to a pool for use by other wireless devices after expiration of a timer or responsive to a delete notification message.

20 Claims, 18 Drawing Sheets

1300 ⤵

```
BY A WIRELESS DEVICE
```

ESTABLISHING A FIRST CONNECTION WITH A LOCAL CELLULAR WIRELESS NETWORK USING CREDENTIALS OF A BOOTSTRAP ESIM CONFIGURED WITH AN INITIAL INTERNATIONAL MOBILE SUBSCRIBER IDENTITY (I-IMSI) VALUE SELECTED FROM A POOL OF I-IMSI VALUES STORED IN THE WIRELESS DEVICE
1302

SENDING, VIA THE FIRST CONNECTION TO A BOOTSTRAP SERVER, A BOOTSTRAP IMSI (B-IMSI) REQUEST FOR A B-IMSI VALUE, THE B-IMSI REQUEST INCLUDING A UNIQUE DEVICE IDENTIFIER (ID) FOR THE WIRELESS DEVICE AND A USE CASE TYPE, WHERE THE USE CASE TYPE INDICATES A PURPOSE FOR WHICH THE WIRELESS DEVICE REQUESTS THE B-IMSI VALUE
1304

RECEIVING, VIA THE FIRST CONNECTION FROM THE BOOTSTRAP SERVER, THE B-IMSI VALUE
1306

RECONFIGURING THE BOOTSTRAP ESIM USING THE B-IMSI VALUE
1308

ESTABLISHING A SECOND CONNECTION WITH THE LOCAL CELLULAR WIRELESS NETWORK OR WITH ANOTHER CELLULAR WIRELESS NETWORK USING CREDENTIALS OF THE BOOTSTRAP ESIM CONFIGURED WITH THE B-IMSI VALUE
1310

DOWNLOADING, FROM A MOBILE NETWORK OPERATOR PROVISIONING SERVER VIA THE SECOND CONNECTION, A USER ESIM
1312

INSTALLING AND ACTIVATING THE USER ESIM ON AN EUICC OF THE WIRELESS DEVICE
1314

ESTABLISHING A THIRD CONNECTION WITH A CELLULAR WIRELESS NETWORK ASSOCIATED WITH THE MNO USING CREDENTIALS OF THE USER ESIM
1316

*FIG. 13*

DYNAMIC BOOTSTRAP eSIM MANAGEMENT FOR A WIRELESS DEVICE

FIELD

The described embodiments set forth techniques for dynamically managing a bootstrap electronic SIM (eSIM) for a wireless device. A configurable bootstrap eSIM is installed in the wireless device and reconfigured as needed to provide limited functionality connectivity options for cellular wireless access to services, such as during device activation, querying for user eSIM availability, and downloading user eSIMs for full functionality connectivity.

BACKGROUND

Many mobile wireless devices are configured to use removable Universal Integrated Circuit Cards (UICCs) that enable the mobile wireless devices to access services provided by Mobile Network Operators (MNOs), which may also be referred to as carriers. In particular, each UICC includes at least a microprocessor and a read-only memory (ROM), where the ROM is configured to store an MNO profile that the wireless device can use to register and interact with an MNO to obtain wireless services via a cellular wireless network. A profile may also be referred to as subscriber identity module (SIM) or SIM profile. Typically, a UICC takes the form of a small removable card, commonly referred to as a SIM card, which is inserted into a UICC-receiving bay of a mobile wireless device. In more recent implementations, UICCs are being embedded directly into system boards of wireless devices as embedded UICCs (eUICCs), which can provide advantages over traditional, removable UICCs. The eUICCs can include a rewritable memory that can facilitate installation, modification, and/or deletion of one or more electronic SIMs (eSIMs) on the eUICC, where the eSIMs can provide for new and/or different services and/or updates for accessing extended features provided by MNOs. An eUICC can store a number of MNO profiles—referred to herein as eSIMs or eSIM profiles—and can eliminate the need to include UICC-receiving bays in wireless devices, e.g., eSIM only cellular-capable wireless devices.

A wireless device can include a bootstrap eSIM, also referred to as a provisioning eSIM, installed at a time of manufacture or dynamically thereafter to the wireless device. The provisioning eSIM provides a limited functionality connectivity option to allow the wireless device to connect to a cellular wireless network for services, such as for device activation, user eSIM provisioning queries, user eSIM installation, or the like. Presently, bootstrap eSIMs can be uniquely generated and uniquely to wireless devices individually; however, with alternative non-cellular wireless connectivity available in many cases, the uniquely assigned provisioning eSIMs included in many wireless devices are often unused. Static assignment of bootstrap eSIMs to wireless devices at the time of manufacture also cannot leverage specific configuration information for the wireless device only available later in the shipment, sales, and user setup process. There exists a need for mechanisms to manage dynamically bootstrap eSIMs for a wireless device.

SUMMARY

The described embodiments set forth techniques for dynamically managing a bootstrap electronic SIM (eSIM) for a wireless device. As used herein, a configurable bootstrap eSIM may include, but is not limited to, an eSIM that supports a wireless device to provide limited functionality connectivity options for cellular wireless access to services, such as during device activation, querying for user eSIM availability, and downloading user eSIMs for full functionality connectivity. The bootstrap eSIM is first configured, by an on-device bootstrap eSIM controller and/or by an eUICC operating system (OS) component, with an initial international mobile subscriber identity (i-IMSI) value, and the wireless device uses the bootstrap eSIM configured with the i-IMSI to communicate with a bootstrap server via a local cellular wireless network. The wireless device provides information to the bootstrap server including a unique device identifier (ID) for the wireless device and a use case type that indicates a purpose for which the wireless device seeks to access cellular wireless connectivity temporarily. The bootstrap server forwards the information from the wireless device along with location information to a bootstrap rules service, which can be managed by an original equipment manufacturer (OEM) of the wireless device. The bootstrap rules service can query one or more network-based servers to determine availability of eSIMs for the wireless device and/or sales channel information for the wireless device along with location information and the use case type value for the wireless device to determine a bootstrap selection rule and returns the bootstrap selection rule to the bootstrap server. The bootstrap server uses the bootstrap selection rule, received from the bootstrap rules service, to select a temporary bootstrap IMSI (b-IMSI) value, dedicated for temporary use by the wireless device. The wireless device re-configures the bootstrap eSIM on the eUICC with the b-IMSI value obtained from the bootstrap server and establishes a new cellular wireless connection using credentials of the bootstrap eSIM configured with the b-IMSI value in order to perform the intended actions indicated by the use case to bootstrap server. Exemplary values for the use case include wireless device setup (e.g., activation and configuration with OEM managed servers), query for availability of eSIMs pending for the wireless device, and/or access to MNO provisioning servers to download and install one or more fully functional user eSIMs. Use of the b-IMSI value by the wireless device can be limited by the bootstrap server, e.g., based on a timer. After expiration of the timer or in response to a delete notification message for the b-IMSI value received from the wireless device, the bootstrap server returns the b-IMSI value to a pool of available b-IMSI values for allocation other wireless devices.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

FIG. 13 illustrates a flowchart of an exemplary method for a wireless device to obtain and use a b-IMSI value, according to some embodiments.

DETAILED DESCRIPTION

Figure 1:
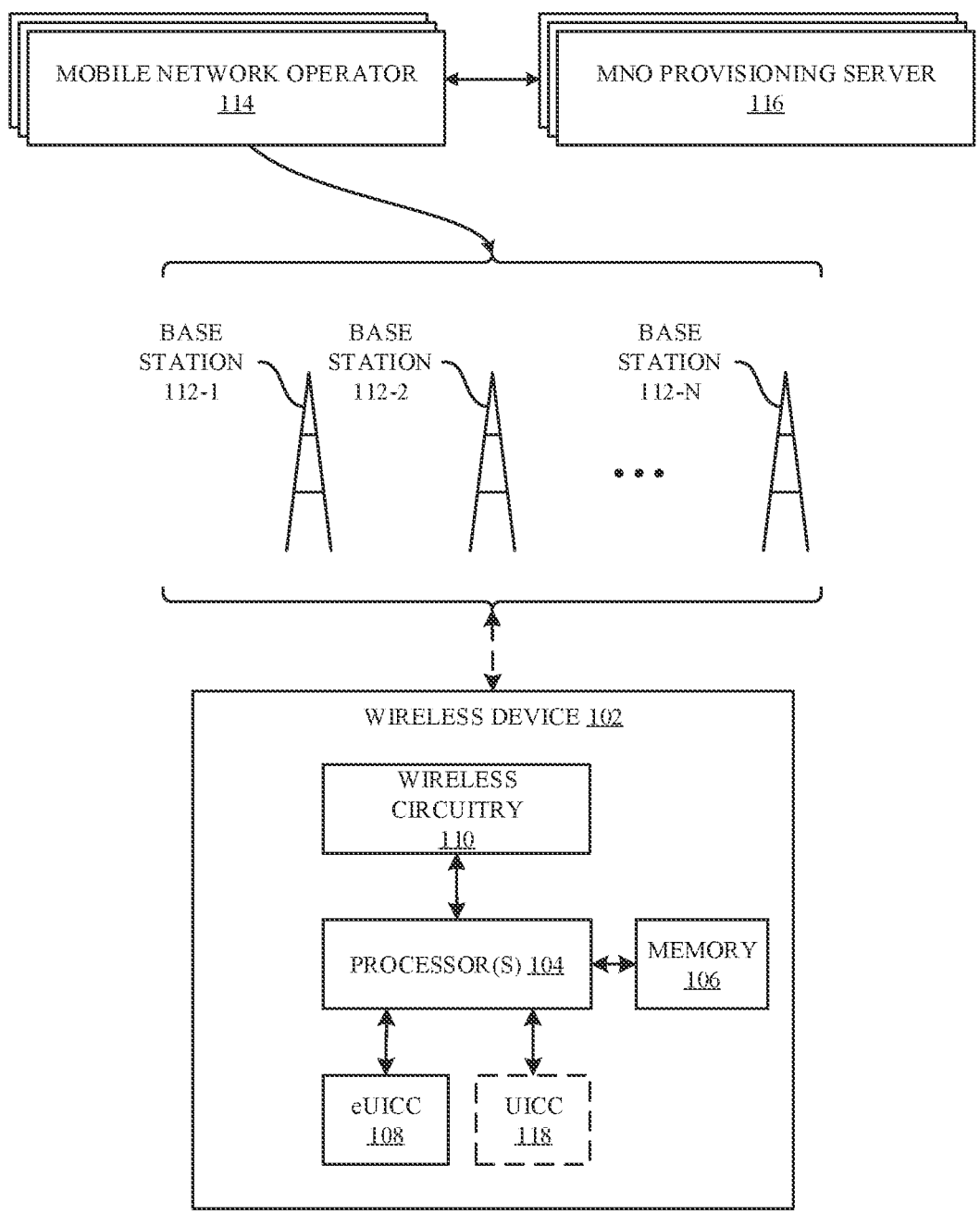
FIG. 1 illustrates a block diagram of different components of an exemplary system configured to implement the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The described embodiments set forth techniques for dynamically managing a bootstrap electronic SIM (eSIM) for a wireless device. As used herein, a configurable bootstrap eSIM may include, but is not limited to, an eSIM that supports a wireless device to provide limited functionality connectivity options for cellular wireless access to services, such as during device activation, querying for user eSIM availability, and downloading user eSIMs for full functionality connectivity. The configurable bootstrap eSIM, which can also referred to as a shared provisioning eSIM, is installed in the wireless device at a time of manufacture or provided dynamically to the wireless device thereafter to an embedded UICC (eUICC) of the wireless device. The configurable bootstrap eSIM is not specific to a particular mobile network operator (MNO), also referred to as a carrier herein, and can be configured to provide a limited functionality connectivity option to allow the wireless device to connect to a cellular wireless network for services. The bootstrap eSIM is first configured, by an on-device bootstrap eSIM controller and/or by an eUICC operating system (OS) component, with an initial IMSI (i-IMSI) value selected from a pool of available i-IMSI values for the wireless device. The i-IMSI value includes a mobile country code (MCC) value and a mobile network code (MNC) value, and configuration of the bootstrap eSIM with the i-IMSI value can also include selection of profile parameters for the bootstrap eSIM in accordance with the selected i-IMSI value. The wireless device establishes a cellular wireless connection to a local cellular wireless network using credentials of the bootstrap eSIM configured based on the i-IMSI value. The pool of i-IMSI values available to the wireless device can also be used by other wireless devices and an IMSI collision, where both the wireless device and another wireless device attempt to use the same i-IMSI value for cellular wireless connectivity, may occur. The probability for an IMSI collision should be low, however, as the cellular wireless connection via the shared i-IMSI value is only used briefly to obtain another non-shared (temporarily dedicated) bootstrap IMSI (b-IMSI) value for the wireless device. The wireless device communicates via the cellular wireless connection with a bootstrap server to obtain the temporary, server-assigned b-IMSI value for the wireless device. The wireless device provides to the bootstrap server, via the local cellular wireless connection enabled by the bootstrap eSIM configured with the i-IMSI value, a unique device identifier (ID) value for the wireless device and a use case type value that indicates a purpose for which the wireless device seeks to obtain temporary cellular wireless access. Examples of use case type values include: i) wireless device setup and configuration, e.g., via communication with original equipment manufacturer (OEM) servers, ii) cellular wireless service querying, e.g., for pending fully functional user eSIMs, or iii) cellular wireless profile acquisition, e.g., downloading and installing eSIMs from a mobile network operator (MNO) server. Examples of unique device ID values include an international mobile equipment identifier (IMEI) value and an eUICC ID (EID) value.

The bootstrap server forwards the unique device ID, the use case type value, and local cellular wireless network location information, e.g., mobile country code (MCC) and mobile network code (MNC) values to a bootstrap rules service. In some embodiments, the bootstrap rules service is managed by the OEM of the wireless device, while the bootstrap server is managed by another entity, e.g., a third party that can managed bootstrap IMSI values locally for one or more MNOs and/or for one or more OEMs. The bootstrap rules service can query a network-based eSIM discovery server using the unique device ID to determine availability of one or more pending eSIMs pre-assigned to the wireless device. The bootstrap rules service can also query a network-based logistics data server using the unique device ID to obtain sales channel information associated with the wireless device (e.g., ship-to data, sold-to data, a specific geographic area associated with the wireless device, a specific MNO associated with the wireless device, etc.). The bootstrap rules service can use the information obtained from the eSIM discovery server and the logistics data server along with the cellular wireless network location information and the use case type value for the wireless device provided by the bootstrap server to determine a bootstrap selection rule for the wireless device. The bootstrap rules service returns the bootstrap selection rule to the bootstrap server to use for selection of the b-IMSI value for the wireless device.

The bootstrap selection rule includes one or more parameters to specify how the bootstrap server should select the b-IMSI value for the wireless device. Exemplary parameters included in the bootstrap selection rule can include indicators for: i) whether assignment of a b-IMSI value to the wireless device is allowed, ii) a specific MNO for which the b-IMSI value should be applicable, iii) a specific geographic area (country or region) for which the b-IMSI value should be applicable, iv) whether assignment of the b-IMSI value should be short term (transient) or long term (semi-permanent), v) a billing code for which charges for cellular wireless access via the bootstrap eSIM configured with the selected b-IMSI value can be applied, and/or vi) a expiration timer value for a duration that the b-IMSI value should be valid. The bootstrap server uses the bootstrap selection rule to select a temporary bootstrap IMSI (b-IMSI) value, dedicated for temporary use by the wireless device, from a pool of available b-IMSI values, and provides the selected b-IMSI value to the wireless device.

The wireless device reconfigures the bootstrap eSIM, using the b-IMSI value and associated profile parameters applicable to the b-IMSI value, and uses credentials of the bootstrap eSIM configured by the selected b-IMSI value to establish a new temporary cellular wireless connection with the same (or with another) local cellular wireless network. The wireless device then communicates with one or more network-based servers to perform tasks associated with the use case type previously provided when requesting the b-IMSI value from the bootstrap server. In some cases, the wireless device communicates with one or more OEM managed servers or mobile network operator (MNO) managed servers to perform one or more initialization and/or configuration procedures for the wireless device. In some embodiments, the wireless device queries for availability of fully functional user eSIMs pending for the wireless device, and when at least one user eSIM is available, downloads and installs the at least one user eSIM from an MNO provisioning server.

Use of the bootstrap eSIM configured with the b-IMSI value by the wireless device can be limited to connections with specific end points, e.g., OEM network-based servers for device configuration or MNO network-based servers for user eSIM acquisition. The assignment of the b-IMSI value to the wireless device can be revoked by the bootstrap server after a time duration elapses, e.g., based on the expiration timer value previously included in the bootstrap selection rule obtained by the bootstrap server from the bootstrap rules service. The expiration timer value can depend on the particular use case type provided by the wireless device when requesting the b-IMSI value. For example, a device setup and initialization procedure that includes communication by the wireless device with OEM servers can require more time than a brief query to an eSIM discovery server that results in an indication that no pending eSIMs are available to the wireless device. In some cases, the wireless device provides a delete notification message to the bootstrap server indicating release of the b-IMSI value by the wireless device, e.g., after successful download, installation, and activation of a fully functional user eSIM on the eUICC of the wireless device. The bootstrap server can return the b-IMSI value to the pool of available b-IMSI values for allocation to other wireless devices. In some embodiments, the bootstrap server causes the local cellular wireless network to clear parameters associated with assignment of the b-IMSI to the wireless device.

These and other embodiments are discussed below with reference to FIGS. 1 through 14; however, those skilled in the art will readily appreciate that the detailed description given herein with respect to these figures is for explanatory purposes only and should not be construed as limiting.

FIG. 1 illustrates a block diagram of different components of a system 100 that is configured to implement the various techniques described herein, according to some embodiments. More specifically, FIG. 1 illustrates a high-level overview of the system 100, which, as shown, includes a wireless device 102, which can also be referred to as a wireless device, a wireless device, a mobile device, a user equipment (UE) and the like, a group of base stations 112-1 to 112-N that are managed by different Mobile Network Operators (MNOs) 114, and a set of provisioning servers 116 that are in communication with the MNOs 114. Additional MNO infrastructure servers, such as used for account management and billing are not shown. The wireless device 102 can represent a mobile computing device (e.g., an iPhone® or an iPad® by Apple®), the base stations 112-1 to 112-n can represent cellular wireless network entities including evolved NodeBs (eNodeBs or eNBs), for fourth generation (4G) long term evolution (LTE) cellular wireless networks, and/or next generation NodeBs (gNodeBs or gNB), for fifth generation (5G) new radio (NR) cellular wireless networks, where the cellular wireless base stations 112-1 to 112-n are configured to communicate with the wireless device 102, and the MNOs 114 can represent different wireless service providers that provide specific cellular wireless services (e.g., voice and data) to which the wireless device 102 can subscribe, such as via a subscription account for a user of the wireless device 102.

As shown in FIG. 1, the wireless device 102 can include processing circuitry, which can include one or more processor(s) 104 and a memory 106, an embedded Universal Integrated Circuit Card (eUICC) 108, and wireless circuitry 110 used for transmission and reception of cellular wireless radio frequency signals. The wireless circuitry 110 can include analog hardware components, such as antennas and amplifiers, as well as digital processing components, such as signal processors (and/or general/limited purpose processors) and associated memory. In some embodiments, the wireless device 102 includes one or more physical UICCs 118, also referred to as Subscriber Identity Module (SIM) cards, in addition to or substituting for the eUICC 108. The components of the wireless device 102 work together to enable the wireless device 102 to provide useful features to a user of the wireless device 102, such as cellular wireless network access, non-cellular wireless network access, localized computing, location-based services, and Internet connectivity. The eUICC 108 can be configured to store multiple electronic SIMs (eSIMs) for accessing cellular wireless services provided by different MNOs 114 by connecting to their respective cellular wireless networks through base stations 112-1 to 112-N. For example, the eUICC 108 can be configured to store and manage one or more eSIMs for one or more MNOs 114 for different subscriptions to which the wireless device 102 is associated. To be able to access services provided by an MNO, an eSIM can be reserved for download and installation to the eUICC 108. In some embodiments, the eUICC 108 obtains one or more eSIMs from one or more associated provisioning servers 116 as part of a device initialization of the wireless device 102, such as when purchasing a new wireless device 102. The provisioning servers 116 can be maintained by a manufacturer of the wireless device 102, the MNOs 114, third party entities, and the like. Communication of eSIM data between an MNO provisioning server 116 and the eUICC 108 (or between the MNO provisioning server 116 and processing circuitry of the wireless device 102 external to the eUICC 108, e.g., the processor 104) can use a secure communication channel.

The wireless device 102, upon initial acquisition by a user, can lack an activated, fully functional cellular wireless eSIM on the eUICC 108 and may also not include a UICC 118 with an activated physical SIM (pSIM) installed in the wireless device 102. The user of the wireless device 102 can be required to download a fully functional eSIM from an MNO provisioning server 116 to access cellular wireless services of a particular MNO with which the user establishes a cellular wireless subscription. After a power-up procedure, the wireless device 102 can enable a limited functionality shared bootstrap eSIM on the eUICC 108 and configure the bootstrap eSIM with an initial international mobile subscriber identity (i-IMSI) value to allow the wireless device 102 to connect to a bootstrap server via a local cellular wireless network to obtain a network-assigned bootstrap IMSI (b-IMSI) value dedicated temporarily to the wireless device in order to perform a limited set of functions, e.g., to initialize and configure the wireless device 102 via an original equipment manufacturer (OEM) procedure and/or to communicate with one or more MNO provisioning servers 116 to query for and/or obtain fully functional eSIMs with which to access cellular wireless services provided by associated MNOs 114.

Figure 2:
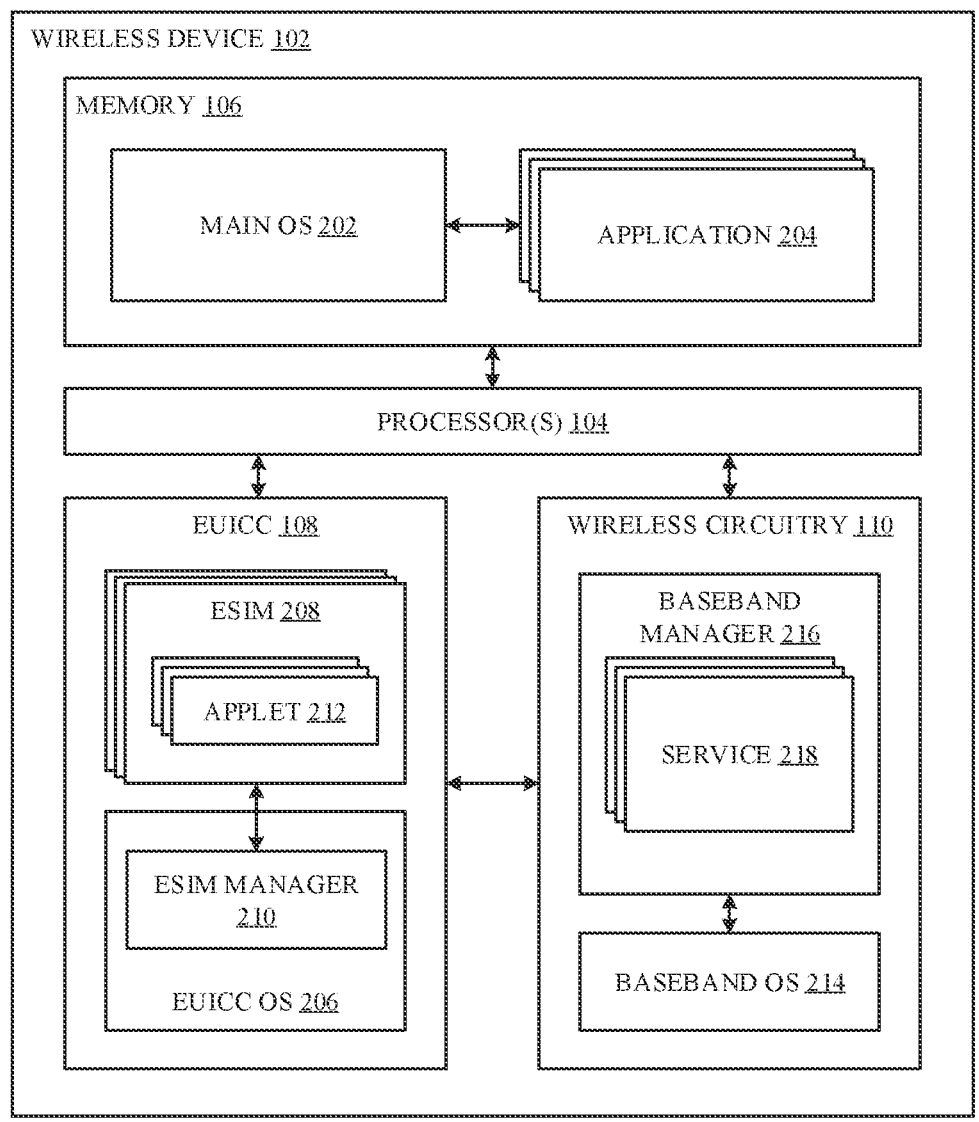
FIG. 2 illustrates a block diagram of a more detailed view of exemplary components of the system of FIG. 1, according to some embodiments.

FIG. 2 illustrates a block diagram of a more detailed view 200 of particular components of the wireless device 102 of FIG. 1, according to some embodiments. As shown in FIG. 2, the processor(s) 104, in conjunction with memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage hardware resources of the eUICC 108 (e.g., a processor and a memory embedded in the eUICC 108). The eUICC OS 206 can also be configured to manage eSIMs 208 that are stored by the eUICC 108, e.g., by downloading, installing, deleting, enabling, disabling, modifying, or otherwise performing management of the eSIMs 208 within the eUICC 108 and providing wireless circuitry 110 with access to the eSIMs 208 to provide access to wireless services for the wireless device 102. The eUICC 108 OS can include an eSIM manager 210, which can perform management functions for various eSIMs 208. According to the illustration shown in FIG. 2, each eSIM 208 can include a number of applets 212 that define the manner in which the eSIM 208 operates. For example, one or more of the applets 212, when implemented in conjunction with wireless circuitry 110 and the eUICC 108, can be configured to enable the wireless device 102 to communicate with an MNO 114 and provide useful features (e.g., phone calls and internet access) to a user of the wireless device 102.

As also shown in FIG. 2, the wireless circuitry 110 of the wireless device 102 can include a baseband OS 214 that is configured to manage hardware resources of the wireless circuitry 110 (e.g., a processor, a memory, different radio components, etc.). According to some embodiments, the wireless circuitry 110 can implement a baseband manager 216 that is configured to interface with the eUICC 108 to establish a secure channel with an MNO provisioning server 116 and obtaining information (such as eSIM data) from the MNO provisioning server 116 for purposes of managing eSIMs 208. The baseband manager 216 can be configured to implement services 218, which represents a collection of software modules that are instantiated by way of the various applets 212 of enabled eSIMs 208 that are included in the eUICC 108. For example, services 218 can be configured to manage different connections between the wireless device 102 and MNOs 114 according to the different eSIMs 208 that are enabled within the eUICC 108. For a bootstrap eSIM 208 that provides limited functionality restricted to certain data connections, such as when a cellular wireless connection via a fully functional user eSIM 208 or a non-cellular wireless connection is unavailable, the wireless device 102 can configure the bootstrap eSIM 208 using an initial IMSI (i-IMSI) value and associated profile parameters, connect to a bootstrap server via a local cellular wireless network using credentials of the bootstrap eSIM 208 configured with the i-IMSI value, obtain from the bootstrap server a temporary bootstrap IMSI (b-IMSI) value, re-configure the bootstrap eSIM 208 with the b-IMSI value and associated profile parameters, and reconnect via the same or another local cellular wireless network to perform one or more procedures, such as device initialization and configuration, querying for fully functional user eSIMs 208, and/or downloading one or more user eSIMs 208 from one or more MNO provisioning servers 116.

Figure 3:
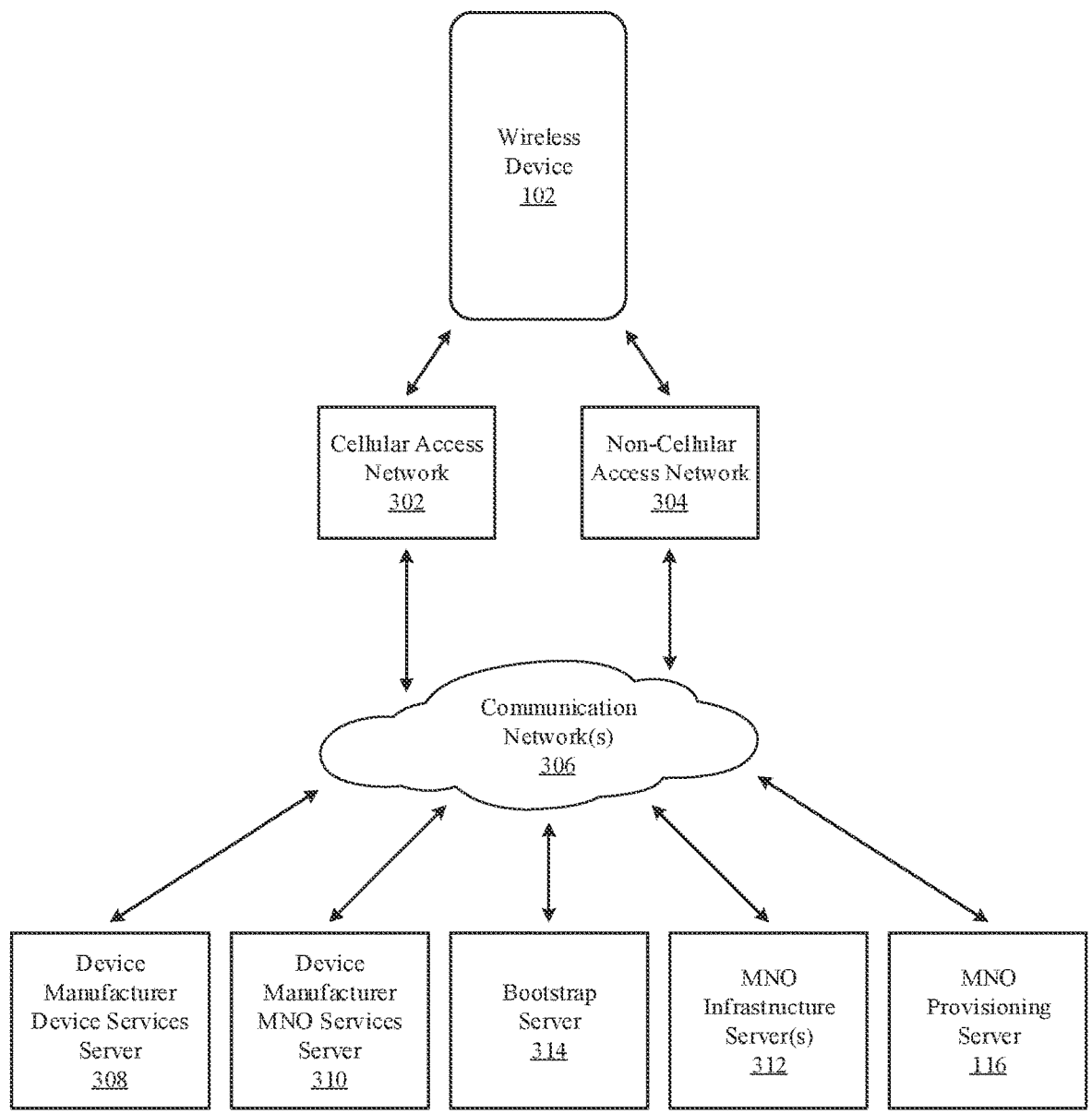
FIG. 3 illustrates an exemplary device activation and provisioning network for a wireless device, according to some embodiments.

FIG. 3 illustrates a diagram 300 of elements of communication network involved in device activation and SIM provisioning, installation, and activation for a wireless device 102. Data connectivity for the wireless device 102 can be required for device activation and SIM provisioning. In some scenarios, a non-cellular access network 304 can be available for the wireless device 102 to connect to various device manufacturer managed and/or MNO 114 managed servers via intervening communication networks 306. In some scenarios, a non-cellular access network 304 may be not available, and the wireless device 102 may rely on access to a cellular access network 302 for activation of the wireless device 102 and for SIM provisioning, e.g., downloading and installation of a fully functional user eSIM 208 to the wireless device 102 from an MNO provisioning server 116. In some embodiments, the wireless device 102 includes a limited functionality shared (configurable) provisioning SIM/eSIM profile that can be used to obtain limited access to a cellular access network 302 for provisioning a fully functional user eSIM 208, e.g., when access to a non-cellular access network 304 that can interconnect to the required servers is not available. An original equipment manufacturer (OEM) of the wireless device 102 can maintain multiple network-based servers to assist with management of the wireless device 102, e.g., a device manufacturer device services server 308, which can provide management for device manufacturer supplied services to the wireless device 102, and a device manufacturer MNO services server 310, which can provide a device manufacturer anchor for management of MNO supplied services to the wireless device 102. An MNO 114 can also provide their own set of servers, including various MNO infrastructure servers 312 for managing cellular access, authentication, authorization, subscription, billing, and other associated management functions for cellular wireless services for the wireless device 102, and MNO provisioning servers 116 from which SIM firmware, e.g., eSIMs 208, OTA updates for eSIMs 208 etc., can be accessed, with appropriate authentication, by the wireless device 102. A bootstrap server 314 can be available for the wireless device 102 to obtain a temporary b-IMSI value with which to configure a bootstrap eSIM 208 on the eUICC 108 of the wireless device 102, where the b-IMSI value is temporarily assigned to the wireless device 102 and later released for re-use. The bootstrap server 314 can be managed by the OEM of the wireless device 102 or by a third party that provides a b-IMSI allocation and management server for one or more OEMs of wireless devices 102 and one or more MNOs 114 that provide local cellular wireless access when using a bootstrap eSIM 208 to access a restricted set of end points. The bootstrap server 314 can communicate with one or more of the device manufacturer managed servers 308/310, supplying information provided by the wireless device 102 when requesting a b-IMSI value for a bootstrap eSIM 208 of the wireless device 102 to the device manufacturer managed servers 308/310, and receiving information provided by the device manufacturer managed servers 308/310 to assist selection of an applicable b-IMSI value and a time duration of validity of a selected b-IMSI value for the wireless device 102.

Figure 4:
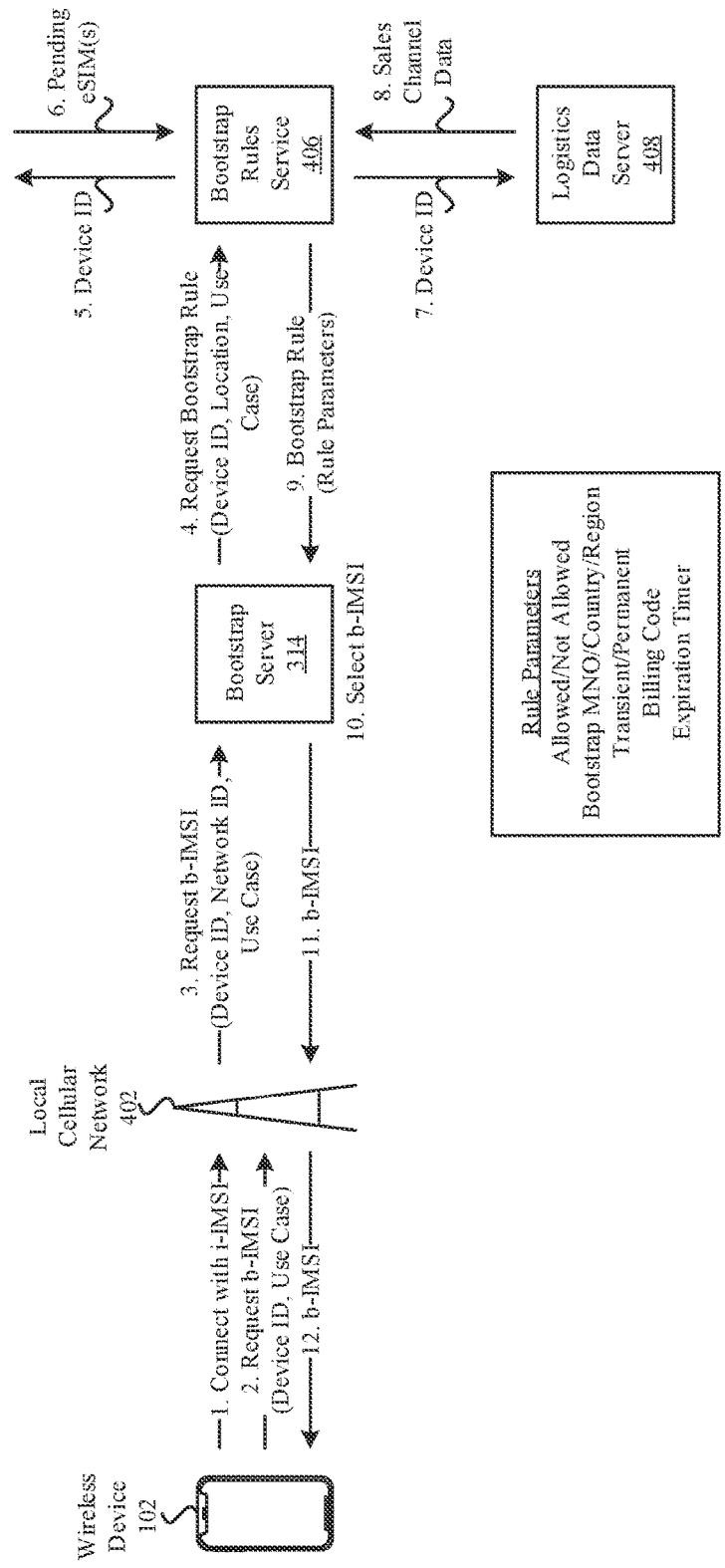
FIG. 4 illustrates a block diagram of an exemplary dynamic bootstrap electronic subscriber identity module (eSIM) network architecture for customizing a bootstrap eSIM of a wireless device, according to some embodiments.

FIG. 4 illustrates a diagram 400 of an exemplary network architecture for dynamic selection and assignment of a b-IMSI value for a bootstrap eSIM 208 of a wireless device 102. Initially, the wireless device 102 configures the bootstrap eSIM 208 of the wireless device 102 with an i-IMSI value selected from a pool of available i-IMSI values for the wireless device 102. The i-IMSI value includes a mobile country code (MCC) value and a mobile network code (MNC) value, and configuration of the bootstrap eSIM 208 with the i-IMSI value can also include selection of profile parameters for the bootstrap eSIM 208 in accordance with the selected i-IMSI value. The wireless device 102 establishes a connection with a local cellular network 402 using credentials of the bootstrap eSIM 208 configured with the i-IMSI value. The i-IMSI value can be selected by the wireless device 102 from a pool of available i-IMSI values stored in the wireless device 102. The selected i-IMSI value is not guaranteed to be unique and may be also in use with another wireless device 102; however, the time duration over which the wireless device 102 uses the i-IMSI value for acquiring a temporary, b-IMSI value, dedicated to the wireless device 102 while in use, is relatively short, and therefore a likelihood of an IMSI collision occurring, where two wireless devices 102 attempt to connect using the same i-IMSI value, is relatively low. The wireless device 102 sends to the local cellular network 402 a request for a temporary b-IMSI value, the request including a unique device identifier (ID) value and a use case type value, where the use case type indicates a purpose for which the wireless device 102 requests the b-IMSI value. Examples of use case type values include: i) wireless device setup and configuration, e.g., via communication with original equipment manufacturer (OEM) servers, ii) cellular wireless service querying, e.g., for pending fully functional user eSIMs, or iii) cellular wireless profile acquisition, e.g., downloading and installing eSIMs from a mobile network operator (MNO) server. Examples of unique device ID values include an international mobile equipment identifier (IMEI) value and an eUICC ID (EID) value. The local cellular network 402 forwards a corresponding request for a b-IMSI value to a bootstrap server 314, the corresponding request including, with the device ID value and use case type value received from the wireless device 102, a network identifier (ID) value for the local cellular wireless network, e.g., an MCC value and MNC value, with which the bootstrap server 314 can determine a geographic location at which the wireless device 102 is operating. The bootstrap server 314 sends to a bootstrap rules service 406 a request for a bootstrap selection rule to use for allocation of an applicable b-IMSI value for the wireless device 102. The request for the bootstrap selection rule includes the device ID value of the wireless device 102, a geographic location value, e.g., an MCC value and an MNC value, and the use case type value provided by the wireless device 102. The bootstrap server 314 can be managed by a third party entity and manage assignment and subsequent revocation of b-IMSI values for wireless devices 102 manufactured by different OEMs. The different b-IMSI values can also be associated with different MNOs applicable to different geographic regions and/or based on contractual business arrangements between the MNOs and the OEMs. The bootstrap rules service 406 can use the information included in the request for the bootstrap selection rule to determine a set of rule parameters to include in the bootstrap selection rule returned to the bootstrap server 314. In some cases, the bootstrap rules service 406 provides the unique device ID value of the wireless device 102 to an eSIM discovery server 404 and receives an indication of zero (no eSIMs pending) or of one or more eSIMs pending delivery to the wireless device 102, where each eSIM is associated with a specific MNO 114. In some cases, the bootstrap rules service 406 provides the unique device ID value of the wireless device 102 to a logistics data server 408 and receives sales channel data that can indicate ship-to information and/or sold-to information for the wireless device 102, e.g., a specific MNO 114 associated with the wireless device 102 or a specific geographic region for operation of the wireless device 102. The information available from the eSIM discovery server 404 and the logistics data server 408 can be unavailable at a time of manufacture of the wireless device 102 and allow for greater specificity in determining parameters for a bootstrap eSIM 208 for the wireless device 102 than would be available for assignment of a static bootstrap eSIM 208 to the wireless device 102 when manufactured. The bootstrap rules service 406 can use the information included in the request bootstrap rule along with information from the eSIM discovery server 404 and the logistics data server 408 to determine the selection rule parameters to include in the bootstrap selection rule. Exemplary parameters included in the bootstrap selection rule can include indicators for: i) whether assignment of a b-IMSI value to the wireless device is allowed, ii) a specific MNO for which the b-IMSI value should be applicable, iii) a specific geographic area (country or region) for which the b-IMSI value should be applicable, iv) whether assignment of the b-IMSI value should be short term (transient) or long term (semi-permanent), v) a billing code for which charges for cellular wireless access via the bootstrap eSIM configured with the selected b-IMSI value can be applied, and/or vi) a expiration timer value for a duration that the b-IMSI value should be valid. The bootstrap server uses the bootstrap selection rule to select a temporary bootstrap IMSI (b-IMSI) value, dedicated for temporary use by the wireless device, from a pool of available b-IMSI values, and provides the selected b-IMSI value to the wireless device. The wireless device reconfigures the bootstrap eSIM 208, using the b-IMSI value and associated profile parameters applicable to the b-IMSI value, and after re-configuration of the bootstrap eSIM 208, the wireless device can use credentials of the bootstrap eSIM 208 to establish a new cellular wireless connection with the same (or with another) local cellular wireless network in order to perform one or more procedures, e.g., as indicated previously in the use case type when requesting the b-IMSI value. For example, the wireless device 102 can perform a setup procedure with one or more OEM servers, query for pending user eSIMs 208 available for the wireless device 102, or download one or more user eSIMs 208 from associated MNO provisioning servers 116.

Figure 5:
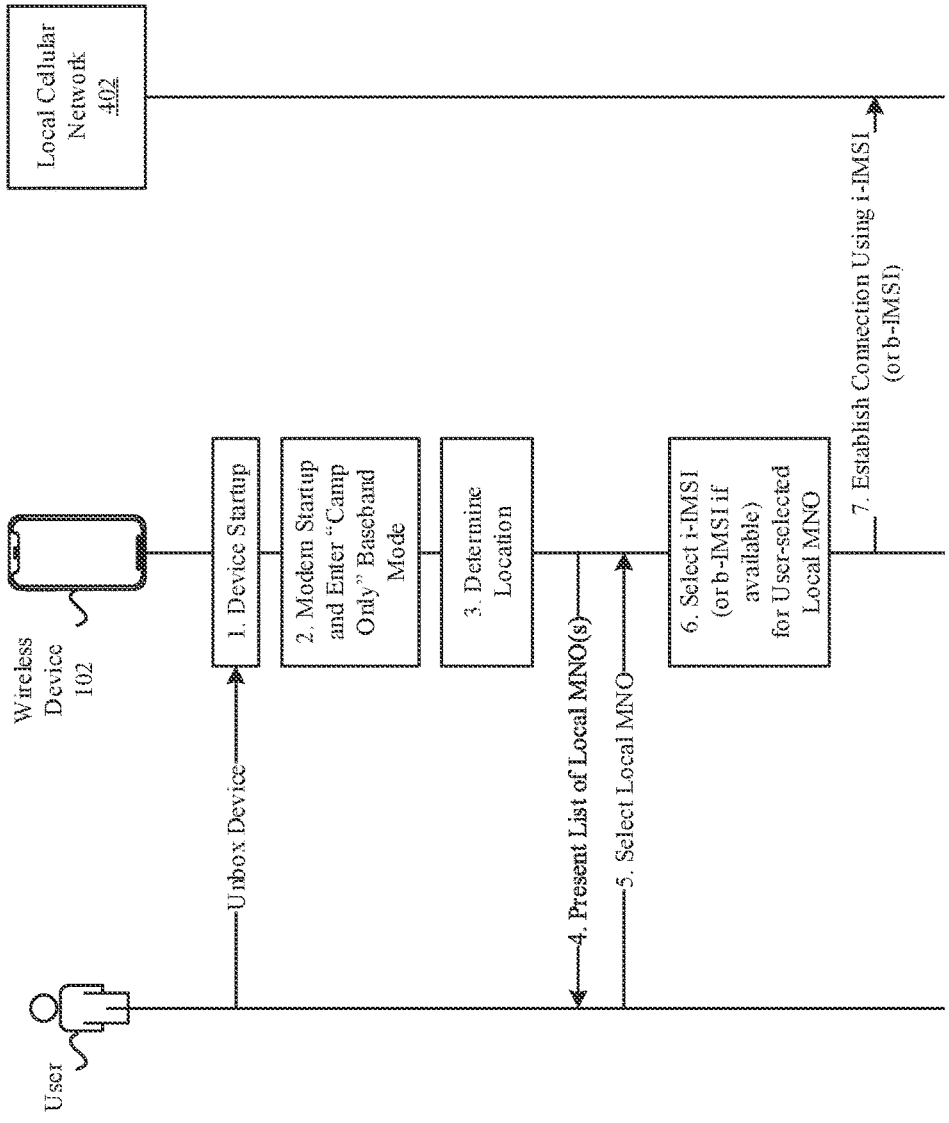
FIG. 5 illustrates a flow diagram of an example of locally configuring a bootstrap eSIM of a wireless device, according to some embodiments.

FIG. 5 illustrates a flow diagram 500 of an example of a wireless device 102 locally configuring a bootstrap eSIM 208 based on user input. In the example of FIG. 5, a user unboxes a new, un-personalized wireless device 102 and initiates a device setup procedure. A communications modem process, resident at least in part on wireless circuitry 110 of the wireless device 102 including a wireless baseband processor, is initiated and enters a "camp only" baseband mode. The modem process can scan for broadcast radio frequency signals from cellular wireless networks and/or access global positioning system (GPS) signals to determine a geographic location of the wireless device 102 and available local cellular wireless access networks. The wireless device 102 presents, via a display of the wireless device 102, a list of local MNOs 114 for which a local cellular wireless access network is available. The user indicates to the wireless device 102 a selection of a local MNO 114. The wireless device 102 (e.g., the eUICC 108 or an external processor communicatively coupled to the eUICC 108) selects an i-IMSI value (or a b-IMSI value if available and known locally to the wireless device 102) associated with the MNO 114 selected by the user and configures a bootstrap eSIM 208 preloaded into the eUICC 108 of the wireless device 102 with the selected i-IMSI (or b-IMSI) value and associated profile parameters. The wireless device 102 subsequently establishes a connection with a local cellular network 402 using credentials of the bootstrap eSIM 208 configured with the i-IMSI (or b-IMSI) value.

Figure 6:
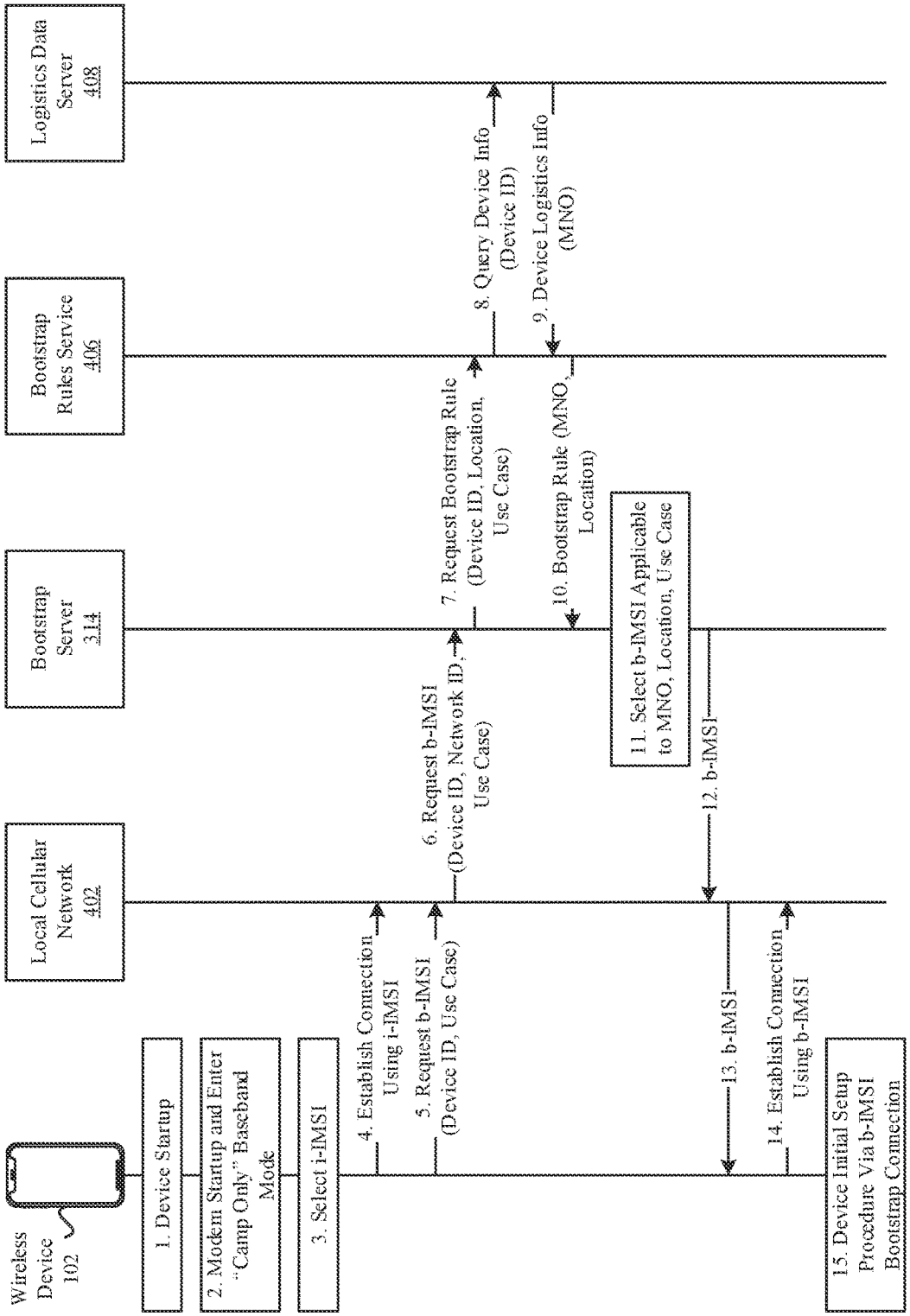
FIG. 6 illustrates a flow diagram of an example of configuring a bootstrap eSIM based on sales channel data for a wireless device, according to some embodiments.

FIG. 6 illustrates a flow diagram 600 of an example of configuring a bootstrap eSIM 208 for a wireless device 102 based on sales channel data. In the example of FIG. 6, a user unboxes a new, un-personalized wireless device 102 that was sold via a sales channel of a particular MNO 114 and initiates a device setup procedure. A communications modem process, resident at least in part on wireless circuitry 110 of the wireless device 102 including a wireless baseband processor, is initiated and enters a "camp only" baseband mode. In some embodiments, the modem process can scan for broadcast radio frequency signals from cellular wireless networks and/or access global positioning system (GPS) signals to determine a geographic location of the wireless device 102 and available local cellular wireless access networks. The wireless device 102 selects an i-IMSI value (which in some embodiments can be based on a determined geographic location of the wireless device 102 and/or a set of available local cellular wireless networks) with which to configure a bootstrap eSIM 208 preloaded on an eUICC 108 of the wireless device 102. The wireless device 102 configures the bootstrap eSIM 208 with the selected i-IMSI value and associated profile parameters. The wireless device 102 subsequently establishes a connection with a local cellular network 402 using credentials of the bootstrap eSIM 208 configured with the i-IMSI value. The wireless device 102 sends a request to the local cellular network 402 for a temporary b-IMSI value to be assigned to the wireless device 102. The request includes a unique device ID value for the wireless device 102 and a use case type value, which indicates a purpose for which the wireless device 102 requests the b-IMSI value. In the example of FIG. 6, the use case type value can be an indication that the wireless device 102 is performing an initial setup procedure and/or to obtain a user eSIM 208 for the wireless device 102. The local cellular network 402 forwards the request (or a corresponding re-generated request) for the b-IMSI value to a bootstrap server 314 adding a network ID value, e.g., an MCC value with an MNC value, which can provide indirectly a geographic location for the wireless device 102. The bootstrap server 314 sends to a bootstrap rules service 406, which can reside on an OEM managed server, such as the device manufacturer device services server 308 or the device manufacturer MNO services server 310 of FIG. 3, a request for a bootstrap selection rule for the wireless device 102. The request for the bootstrap selection rule can include the unique device ID value of the wireless device, a geographic location indicator provided by the bootstrap server 314, which in some cases can be determined by the bootstrap server 314 from the network ID value provided by the local cellular network 402 with the request for the b-IMSI value, and a use case type value provided by the wireless device 102 when requesting the b-IMSI value. In some cases the geographic location indicator is an MCC value and an MNC value. The bootstrap rules service 406 queries a logistics data server 408 using the device ID value and receives device logistics information for the wireless device 102 in return. The logistics information can include ship-to and/or sold-to information, such as when the wireless device 102 is shipped to a retail outlet of a particular MNO 114 or is sold via a sales channel for a particular MNO 114. In the example of FIG. 6, the device logistics information provided to the bootstrap rules service 406 by the logistics data server 408 includes an indicator for a specific MNO 114. The bootstrap rules service 406 determines a bootstrap selection rule based on the device logistics information, the geographic location information, and the use case type value provided by the wireless device 102. For example, the bootstrap rules service 406 can determine that the wireless device 102 was shipped and sold via a sales channel of a specific MNO 114, is located in the same geographic region serviced by the specific MNO 114, and the use case type value indicates the wireless device 102 is executing a setup process. The bootstrap rule returned to the bootstrap server 314 by the bootstrap rules service 406 can include an indicator for the specific MNO 114 and a geographic location indicator associated with the specific MNO 114. The bootstrap rule can also include additional selection parameters useful for the bootstrap server 314 for selection of an appropriate b-IMSI value for the wireless device 102. The bootstrap server 314 selects a b-IMSI value for the wireless device 102 based on the selection parameters included in the bootstrap selection rule, e.g., a b-IMSI value applicable to the specific MNO 114, appropriate for the specified geographic region, and usable for the use case indicated by the use case type value. The bootstrap server 314 sends the selected b-IMSI value to the wireless device 102 via the local cellular network 402. The wireless device 102 re-configures the bootstrap eSIM 208 using the b-IMSI value and associated profile parameters and establishes a connection with the same or another local cellular network 402 using credentials of the bootstrap eSIM 208 configured with the b-IMSI value. The wireless device 102 continues performing an initial setup procedure with communication via the connection established with the b-IMSI value. The b-IMSI value is dedicated to the wireless device 102 will allocated by the bootstrap server 314, and therefore IMSI collisions to use the bootstrap eSIM configured with the b-IMSI value should not occur. The b-IMSI value is however allocated to the wireless device 102 for a limited time, which can depend on the use case type value provided. For example performing a device setup procedure can require more time than querying for pending eSIMs 208. The b-IMSI value can be revoked after a period of time and/or in response to a delete notification message provided by the wireless device 102 when use of the b-IMSI value for the bootstrap eSIM 208 is no longer required.

Figure 7A:
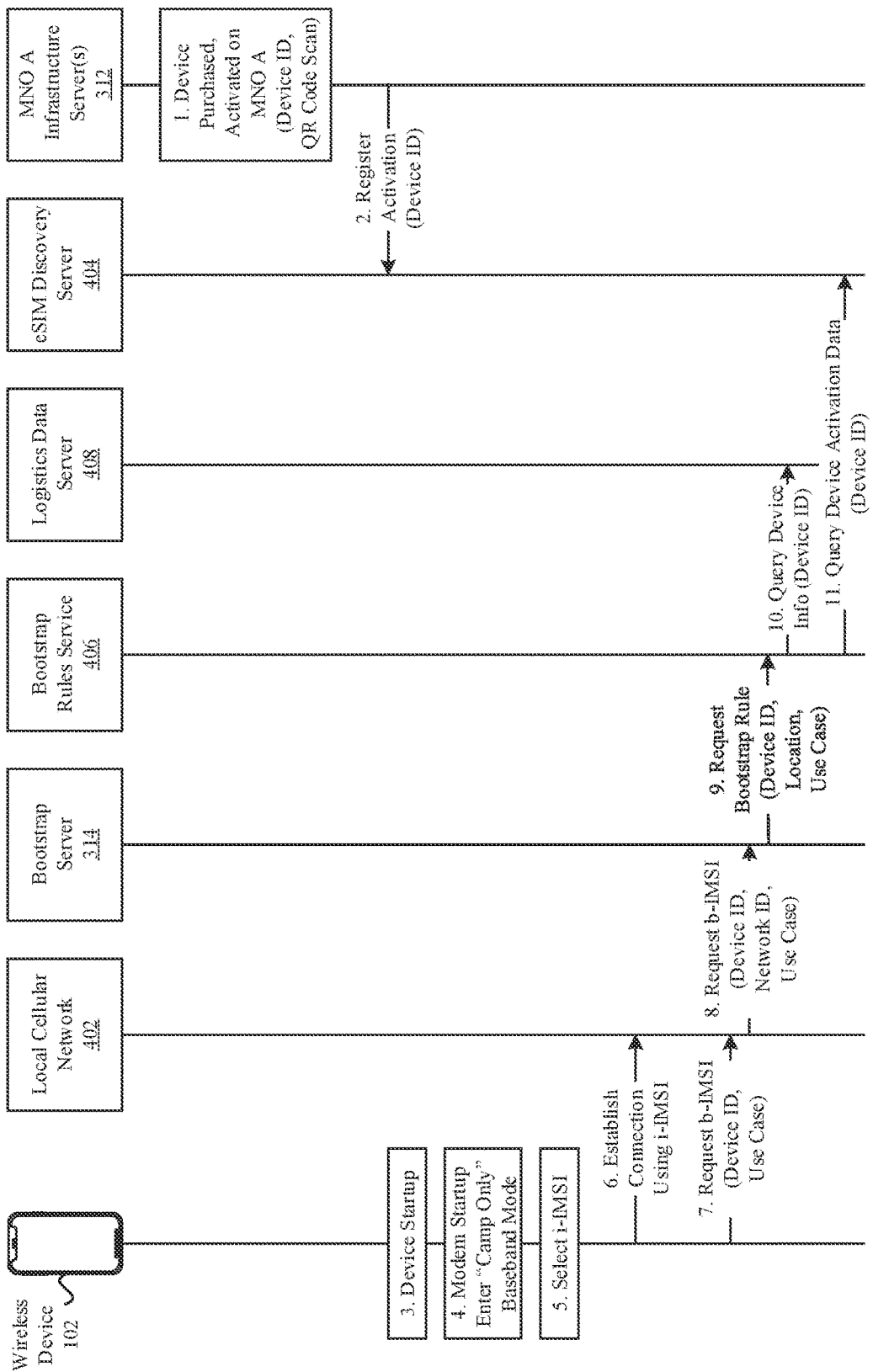
FIGS. 7A and 7B illustrate flow diagrams of an example of configuring a bootstrap eSIM based on mobile network operator (MNO) activation data for a wireless device, according to some embodiments.
Figure 7B:
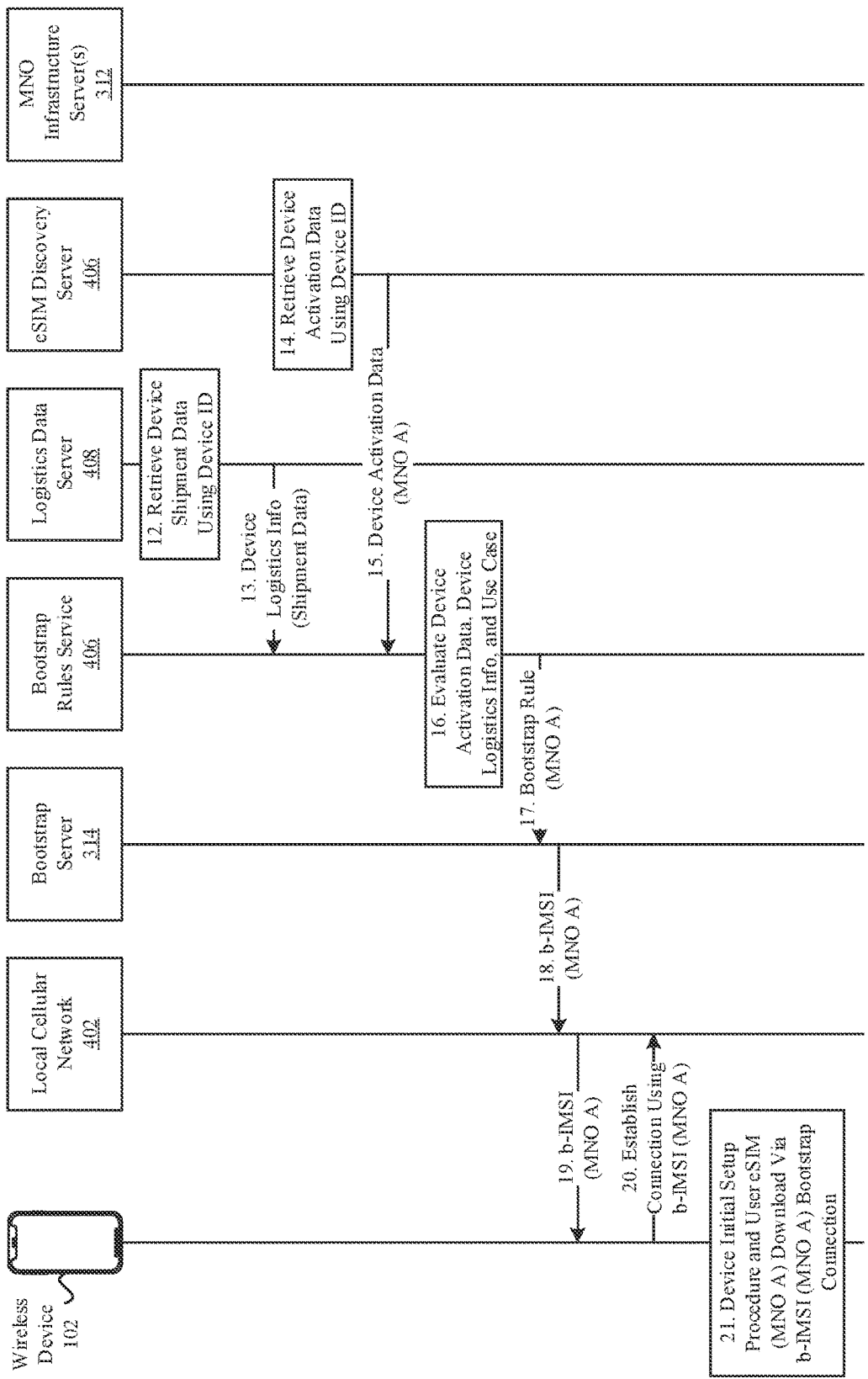

FIGS. 7A and 7B illustrate flow diagrams 700, 710 of an example of configuring a bootstrap eSIM 208 for a wireless device 102 based on MNO activation data. In the example of FIGS. 7A and 7B, a user purchases a new, un-personalized wireless device 102 that can be associated with a cellular service subscription (existing or to be completed by a user) of a particular MNO 114 (MNO A). For example, the wireless device 102 can be purchased to be used on a cellular wireless network of the particular MNO 114 and activated on the backend systems of MNO A, e.g., via one or more MNO A infrastructure servers 312. In some cases, a device ID value for the wireless device 102 is registered with the MNO A infrastructure servers 312, such as via a scan of a quick response (QR) code on the packaging of the wireless device 102. An eSIM 208 for access to cellular wireless services of MNO A can be readied for the wireless device 102 in the MNO A infrastructure servers 312 and available for download on an MNO provisioning server 116. The MNO A infrastructure servers 312 can provide an activation registration message to an eSIM discovery server 404, which can be maintained by an OEM of the wireless device 102, the activation registration message including a device ID value for the wireless device 102 and an indication that an eSIM for cellular wireless service access on cellular wireless networks of MNO A is available for the wireless device 102. The user unboxes the wireless device 102 and initiates a device setup process. A communications modem process, resident at least in part on wireless circuitry 110 of the wireless device 102 including a wireless baseband processor, is initiated and enters a "camp only" baseband mode. In some embodiments, the modem process can scan for broadcast radio frequency signals from cellular wireless networks and/or access global positioning system (GPS) signals to determine a geographic location of the wireless device 102 and available local cellular wireless access networks. The wireless device 102 selects an i-IMSI value (which in some embodiments can be based on a determined geographic location of the wireless device 102 and/or a set of available local cellular wireless networks) with which to configure a bootstrap eSIM 208 preloaded on an eUICC 108 of the wireless device 102. The wireless device 102 configures the bootstrap eSIM 208 with the selected i-IMSI value and associated profile parameters. The wireless device 102 subsequently establishes a connection with a local cellular network 402 using credentials of the bootstrap eSIM 208 configured with the i-IMSI value. The wireless device 102 sends a request to the local cellular network 402 for a temporary b-IMSI value to be assigned to the wireless device 102. The request includes a unique device ID value for the wireless device 102 and a use case type value, which indicates a purpose for which the wireless device 102 requests the b-IMSI value. In the example of FIG. 7, the use case type value can be an indication that the wireless device 102 is performing an initial setup procedure and/or to obtain a user eSIM 208 for the wireless device 102. The local cellular network 402 forwards the request (or a corresponding re-generated request) for the b-IMSI value to a bootstrap server 314 adding a network ID value, e.g., an MCC value with an MNC value, which can provide indirectly a geographic location for the wireless device 102. The bootstrap server 314 sends to a bootstrap rules service 406, which can reside on an OEM managed server, such as the device manufacturer device services server 308 or the device manufacturer MNO services server 310 of FIG. 3, a request for a bootstrap selection rule for the wireless device 102. The request for the bootstrap selection rule can include the unique device ID value of the wireless device, a geographic location indicator provided by the bootstrap server 314, which in some cases can be determined by the bootstrap server 314 from the network ID value provided by the local cellular network 402 with the request for the b-IMSI value, and a use case type value provided by the wireless device 102 when requesting the b-IMSI value. In some cases the geographic location indicator is an MCC value and an MNC value. The bootstrap rules service 406 queries a logistics data server 408 using the device ID value and receives device logistics information for the wireless device 102 in return. The logistics information can include ship-to and/or sold-to information, such as when the wireless device 102 is shipped to a retail outlet of an OEM of the wireless device, is shipped to a third party retail outlet, is shipped to a retail outlet of a particular MNO 114, or was shipped directly to a customer, e.g., the user of the wireless device 102. The bootstrap rules service 406 also queries an eSIM discovery server 404 using the device ID value and receives device activation data. In the example of FIG. 7B, the device activation data includes an indication of a specific MNO 114, e.g., MNO A, for which the wireless device 102 has previously been activated for cellular wireless service (pending delivery of an associated eSIM 208 to the wireless device 102 that will allow the wireless device 102 to access the cellular wireless service.) The bootstrap rules service 406 evaluates the device activation data from the eSIM discovery server 404, the device logistics information from the logistics data server 408, and the use case type value received from the wireless device 102 to determine a bootstrap selection rule to return to the bootstrap server 314. The bootstrap rules service 406 can determine that the wireless device 102 has been pre-activated for MNO A and a pending eSIM 208 is available for the wireless device 102. The bootstrap rules service 406 can indicate the particular MNO 114, e.g., MNO A, in the bootstrap selection rule as well as include additional parameters useful for selection of the b-IMSI value by the bootstrap server 314. For example, the bootstrap rule can include an expiration timer value that accounts for the use case type value provided by the wireless device 102 previously, where the wireless device 102 is performing a setup procedure and will likely download an eSIM for MNO A prepared for the wireless device 102. The bootstrap server 314 selects a b-IMSI value for the wireless device 102 based on the selection parameters included in the bootstrap selection rule, e.g., a b-IMSI value applicable to the specific MNO 114, appropriate for the specified geographic region, and usable for the use case indicated by the use case type value. The bootstrap server 314 sends the selected b-IMSI value to the wireless device 102 via the local cellular network 402. The wireless device 102 re-configures the bootstrap eSIM 208 using the b-IMSI value and associated profile parameters and establishes a connection with the same or another local cellular network 402 using credentials of the bootstrap eSIM 208 configured with the b-IMSI value. The wireless device 102 continues performing an initial setup procedure with communication via the connection established with the b-IMSI value. The wireless device 102 further downloads a user eSIM for MNO A from an MNO provisioning server 116 via the connection established with the b-IMSI value.

Figure 8:
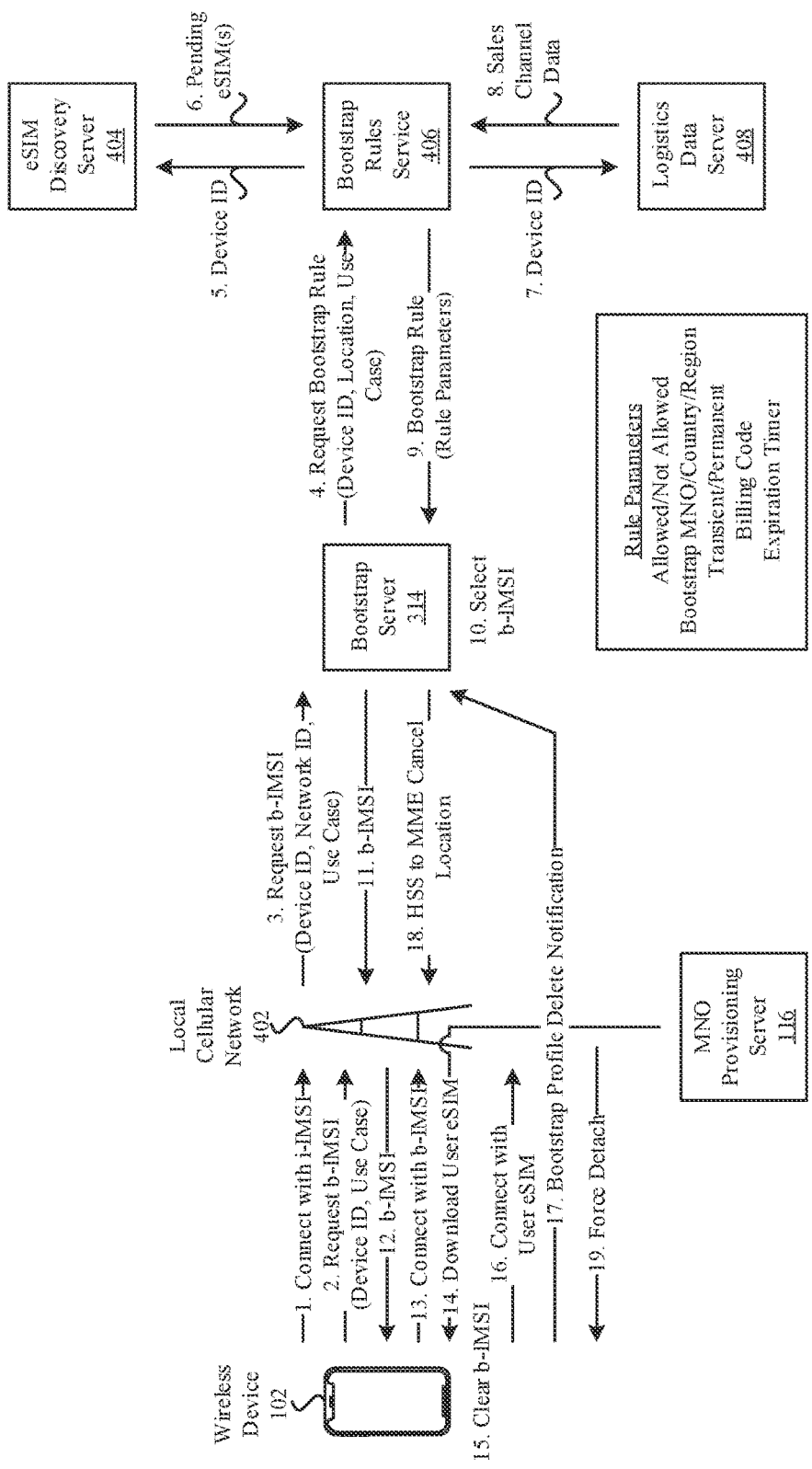
FIG. 8 illustrates a block diagram of an exemplary temporary bootstrap eSIM lease termination procedure for a wireless device, according to some embodiments.

FIG. 8 illustrates a diagram 800 of an exemplary network architecture for dynamic selection, assignment, and release of a b-IMSI value for a bootstrap eSIM 208 of a wireless device 102. The first twelve steps shown in FIG. 8 are identical to those described for FIG. 4, and the description from FIG. 4 also applies here and will not be repeated for brevity. At the twelfth step, the wireless device 102 receives a b-IMSI value, configures the bootstrap eSIM 208 on the eUICC 108 using the b-IMSI value and associated profile parameters, and subsequently, at the thirteenth step, connects to the same (or another) local cellular network 402 using credentials of the bootstrap eSIM 208 configured with the b-IMSI value. The wireless device 102, at the fourteenth step, downloads from an MNO provisioning server 116 a fully functional user eSIM 208, and installs and activates the user eSIM 208 on the eUICC 108 of the wireless device 102. The wireless device 102, at the fifteenth step, clears the b-IMSI value from the bootstrap eSIM 208 after successful activation of the user eSIM 208. The wireless device 102, at the sixteenth step, connects with the local cellular network 402 (or with another local cellular network 402) using credentials of the user eSIM 208. At the seventeenth step, the wireless device 102 sends to the bootstrap server 314 a bootstrap profile delete notification message indicating that the b-IMSI value has been cleared from the bootstrap eSIM 208 and no longer required by the wireless device 102. In some cases, the bootstrap server 314 causes a home subscriber server (HSS) of the MNO 114 associated with the local cellular network 402 to send to a mobility management entity (MME) of the MNO 114 associated with the local cellular network 402 a cancel location message to clear any remaining parameters from use of the b-IMSI by the wireless device 102 in the local cellular network 402. In some cases, the local cellular network 402 performs a force detach procedure to clear b-IMSI use by the wireless device 102, and close any remaining connections associated with the b-IMSI value for the wireless device 102.

Figure 9A:
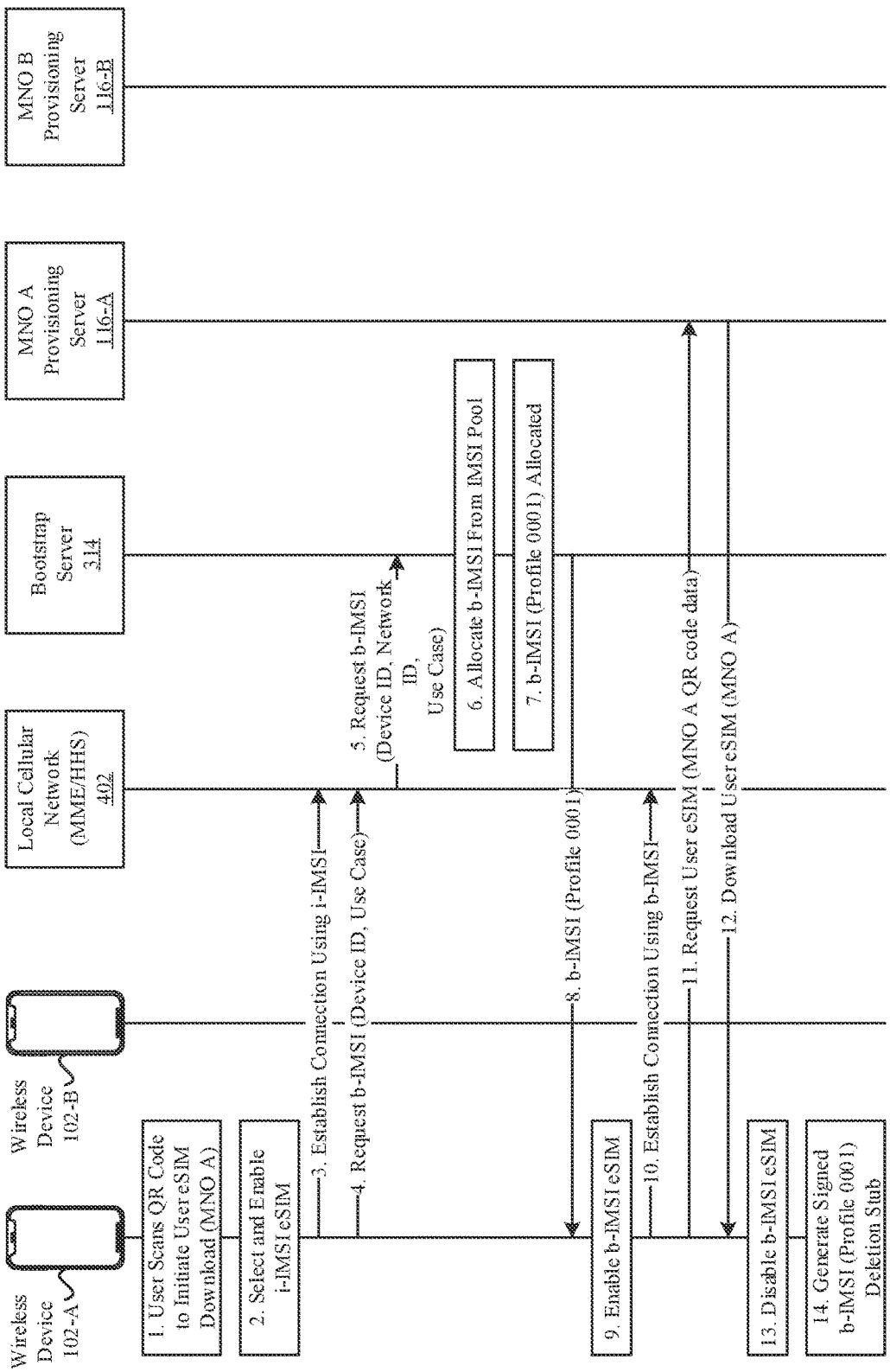
FIGS. 9A, 9B, and 9C illustrate flow diagrams of an example of temporary bootstrap eSIM assignment, release, and reuse for wireless devices, according to some embodiments.
Figure 9B:
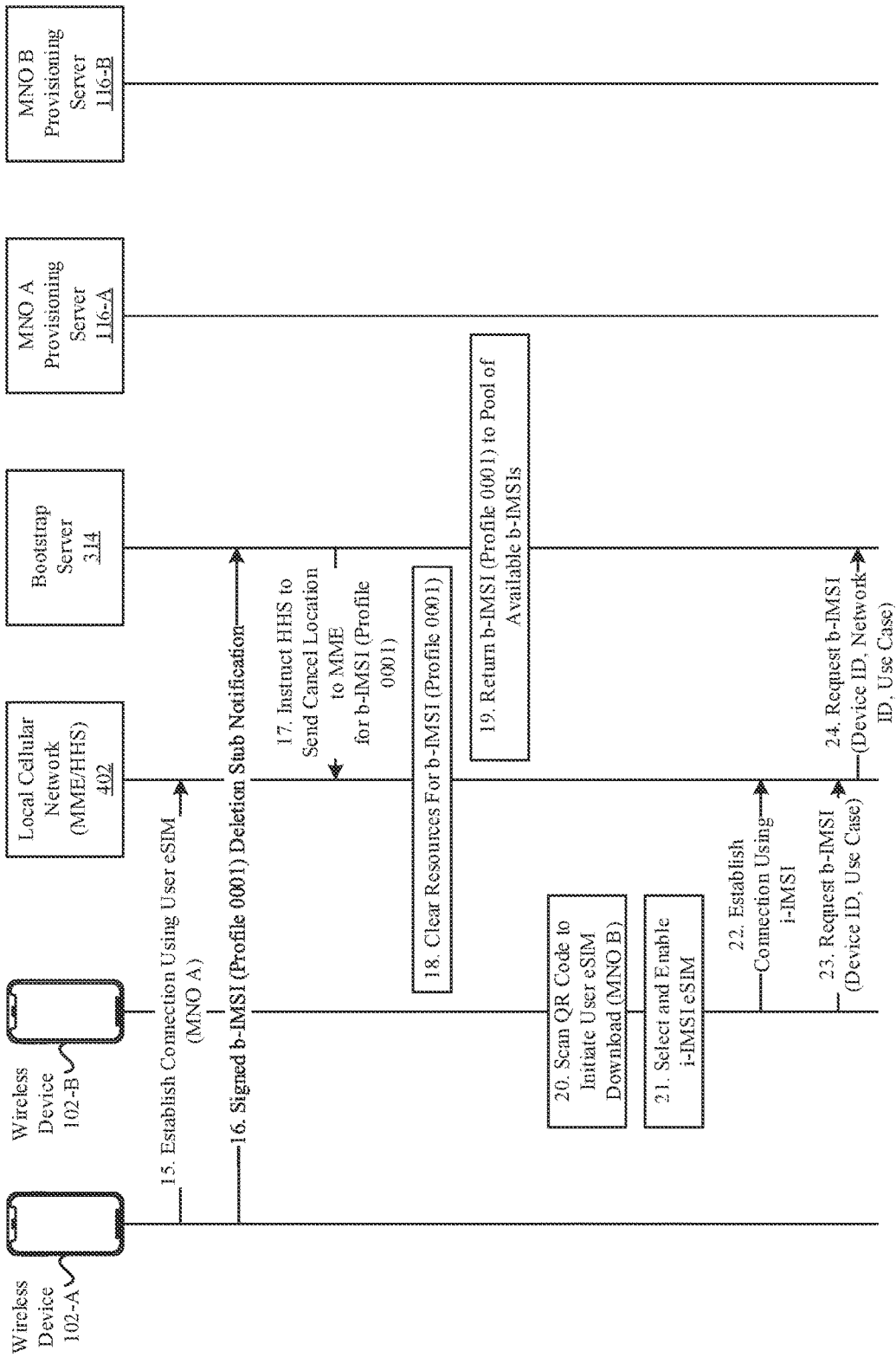
Figure 9C:
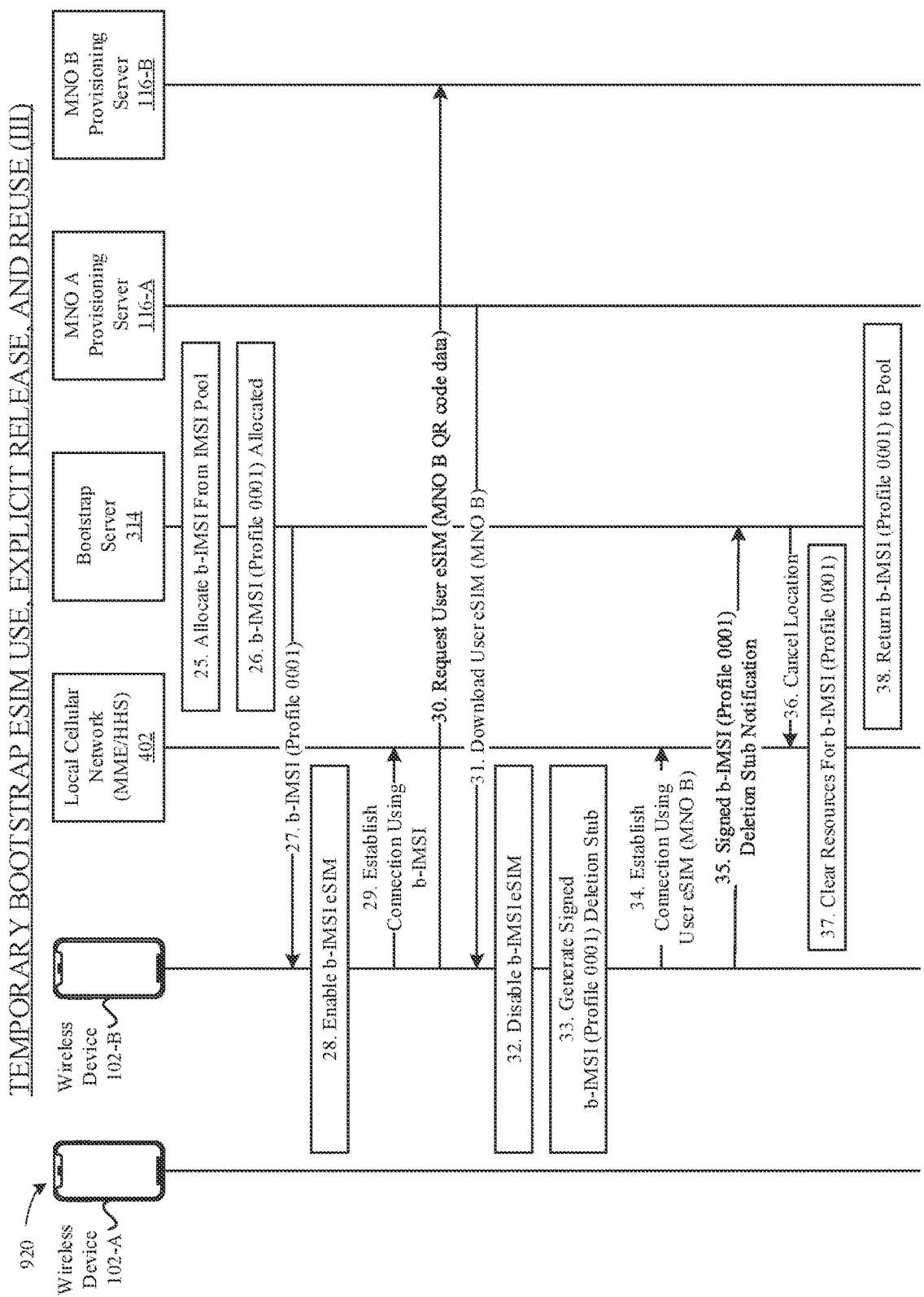

FIGS. 9A, 9B, and 9C illustrate flow diagrams 900, 910, 920 of an example of temporary assignment of a b-IMSI value for a bootstrap eSIM 208 to a first wireless device 102-A, followed by release of the b-IMSI value by the first wireless device 102-A, and subsequent reuse of the b-IMSI value by a second wireless device 102-B. The example of FIGS. 9A, 9B, and 9C illustrates a first wireless device 102-A that seeks to use a bootstrap eSIM 208 to obtain a user eSIM 208, where the first wireless device 102-A initially has no connectivity for downloading the user eSIM 208, and later a second wireless device 102-B seeks to also use a bootstrap eSIM 208 to obtain a user eSIM 208. A user of the first wireless device 102-A initiates a user eSIM 208 profile download procedure to obtain a user eSIM 208 for a particular MNO 114 (MNO A), e.g., by scanning a QR code received from the MNO 114 with the first wireless device 102-A. The first wireless device 102-A selects an i-IMSI value from a pool of available i-IMSI values for the first wireless device 102-A and configures a bootstrap eSIM 208 on an eUICC 108 of the first wireless device 102-A based on the selected i-IMSI value and associated profile parameters. The first wireless device 102-A establishes a connection with a local cellular network 402 using credentials of the bootstrap eSIM 208 configured with the i-IMSI value and sends a request to the local cellular network 402 for a b-IMSI value to be temporarily assigned to the first wireless device 102-A. The request for the b-IMSI value includes a unique device ID value for the first wireless device 102-A and a use case type value indicating a reason for which the first wireless device 102-A requests allocation of the b-IMSI value. In the example of FIG. 9A, the use case type value can indicate the first wireless device 102-A intends to download a user eSIM 208 based on a scan of a QR code. The local cellular network 402 forwards the request (or a corresponding re-generated request) for the b-IMSI value to a bootstrap server 314 adding a network ID value, e.g., an MCC value with an MNC value, which can provide indirectly a geographic location for the first wireless device 102-A. The bootstrap server 314 allocates a b-IMSI value, from a pool of available b-IMSI values, to the first wireless device 102-A in accordance with a bootstrap selection rule obtained from a bootstrap rules service 406 (not shown). The selected b-IMSI value can be associated with a set of profile parameters for a particular bootstrap eSIM 208 (indicated as profile 0001 in FIG. 9A). The bootstrap server 314 returns the selected b-IMSI value (associated with bootstrap eSIM profile 0001) to the first wireless device 102-A, which configures the bootstrap eSIM 208 with the b-IMSI value and the associated profile parameters. After enabling the bootstrap eSIM 208, the first wireless device 102-A establishes a connection with the local cellular network 402 (or with another local cellular network 402) using credentials of the bootstrap eSIM configured with the b-IMSI value. The first wireless device 102-A sends a request for a user eSIM 208 to an MNO A provisioning server 116-A, the request including data obtained from the QR code scan. The first wireless device 102-A downloads the user eSIM 208 from the MNO A provisioning server 116-A, installs the downloaded user eSIM 208 on the eUICC 108 of the first wireless device 102-A, and enables the user eSIM 208 on the eUICC 108. The first wireless device 102-A can disable the bootstrap eSIM 208 configured with the b-IMSI value after downloading the user eSIM 208. The first wireless device 102-A generates a delete notification message (e.g., a deletion stub) signed by the eUICC 108 (to prove authenticity of the delete notification message) and sends the signed delete notification message to the bootstrap server 314, via a connection established with a local cellular network 402 using credentials of the user eSIM 208, to indicate that the first wireless device 102-A has disabled the bootstrap eSIM and no longer using the b-IMSI value. The bootstrap server 314 sends an instruction to an HSS of an MNO 114 associated with the local cellular network 402 to send a cancel location message to the MME of the MNO 114 to clear any resources associated with use of the b-IMSI value by the first wireless device 102-A. The bootstrap server 314 then returns the b-IMSI value to the pool of available b-IMSI values for future allocation to wireless devices 102.

In the examples illustrated by FIGS. 9A, 9B, and 9C, a second wireless device 102-B can be allocated the same b-IMSI value that was previously allocated to (and subsequently released by) the first wireless device 102-A. The second wireless device 102-B can request use of the b-IMSI value for any number of reasons, including for example to download a user eSIM 208 associated with a particular MNO 114, e.g., MNO B. The second wireless device 102-B can have no cellular (or non-cellular) wireless connectivity initially when a user initiates acquisition of a user eSIM 208 for MNO B, e.g., by scanning a QR code. The second wireless device 102-B selects an i-IMSI value, from a pool of available i-IMSI values for the second wireless device 102-B, and configures a bootstrap eSIM 208 on an eUICC 108 of the second wireless device 102-B using the i-IMSI value and associated profile parameters. The second wireless device 102-B connects to a local cellular network 402 and sends a request for a b-IMSI value, the request including a unique device ID for the second wireless device 102-B and a user case type value indicating a reason for which the second wireless device 102-B requests allocation of the b-IMSI value. In the example of FIG. 9B, the use case type value can indicate the second wireless device 102-B intends to download a user eSIM 208 based on a scan of a QR code. The local cellular network 402 forwards the request (or a corresponding re-generated request) for the b-IMSI value to a bootstrap server 314 adding a network ID value, e.g., an MCC value with an MNC value, which can provide indirectly a geographic location for the second wireless device 102-B. The bootstrap server 314 allocates to the second wireless device 102-B a b-IMSI value, which can be the identical b-IMSI value previously allocated to the first wireless device 102-A and subsequently returned to the pool of available b-IMSI values, where allocation of the b-IMSI value is in accordance with a bootstrap selection rule obtained from a bootstrap rules service 406 (not shown). The selected b-IMSI value can be associated with a set of profile parameters for a particular bootstrap eSIM 208 (indicated as profile 0001 in FIG. 9B). The bootstrap server 314 returns the selected b-IMSI value (associated with bootstrap eSIM profile 0001) to the second wireless device 102-B, which configures the bootstrap eSIM 208 with the b-IMSI value and the associated profile parameters. After enabling the bootstrap eSIM 208, the second wireless device 102-B establishes a connection with the local cellular network 402 (or with another local cellular network 402) using credentials of the bootstrap eSIM configured with the b-IMSI value. The second wireless device 102-B sends a request for a user eSIM 208 to an MNO B provisioning server 116-B, the request including data obtained from the QR code scan. The second wireless device 102-B downloads the user eSIM 208 from the MNO B provisioning server 116-B, installs the downloaded user eSIM 208 on the eUICC 108 of the second wireless device 102-B, and enables the user eSIM 208 on the eUICC 108. The second wireless device 102-B can disable the bootstrap eSIM 208 configured with the b-IMSI value after downloading the user eSIM 208. The second wireless device 102-B generates a delete notification message (e.g., a deletion stub) signed by the eUICC 108 (to prove authenticity of the delete notification message) and sends the signed delete notification message to the bootstrap server 314, via a connection established with a local cellular network 402 using credentials of the user eSIM 208, to indicate that the second wireless device 102-B has disabled the bootstrap eSIM and no longer using the b-IMSI value. The bootstrap server 314 sends an instruction to an HSS of an MNO 114 associated with the local cellular network 402 to send a cancel location message to the MME of the MNO 114 to clear any resources associated with use of the b-IMSI value by the second wireless device 102-B. The bootstrap server 314 then returns the b-IMSI value to the pool of available b-IMSI values for future allocation to wireless devices 102.

Figure 10A:
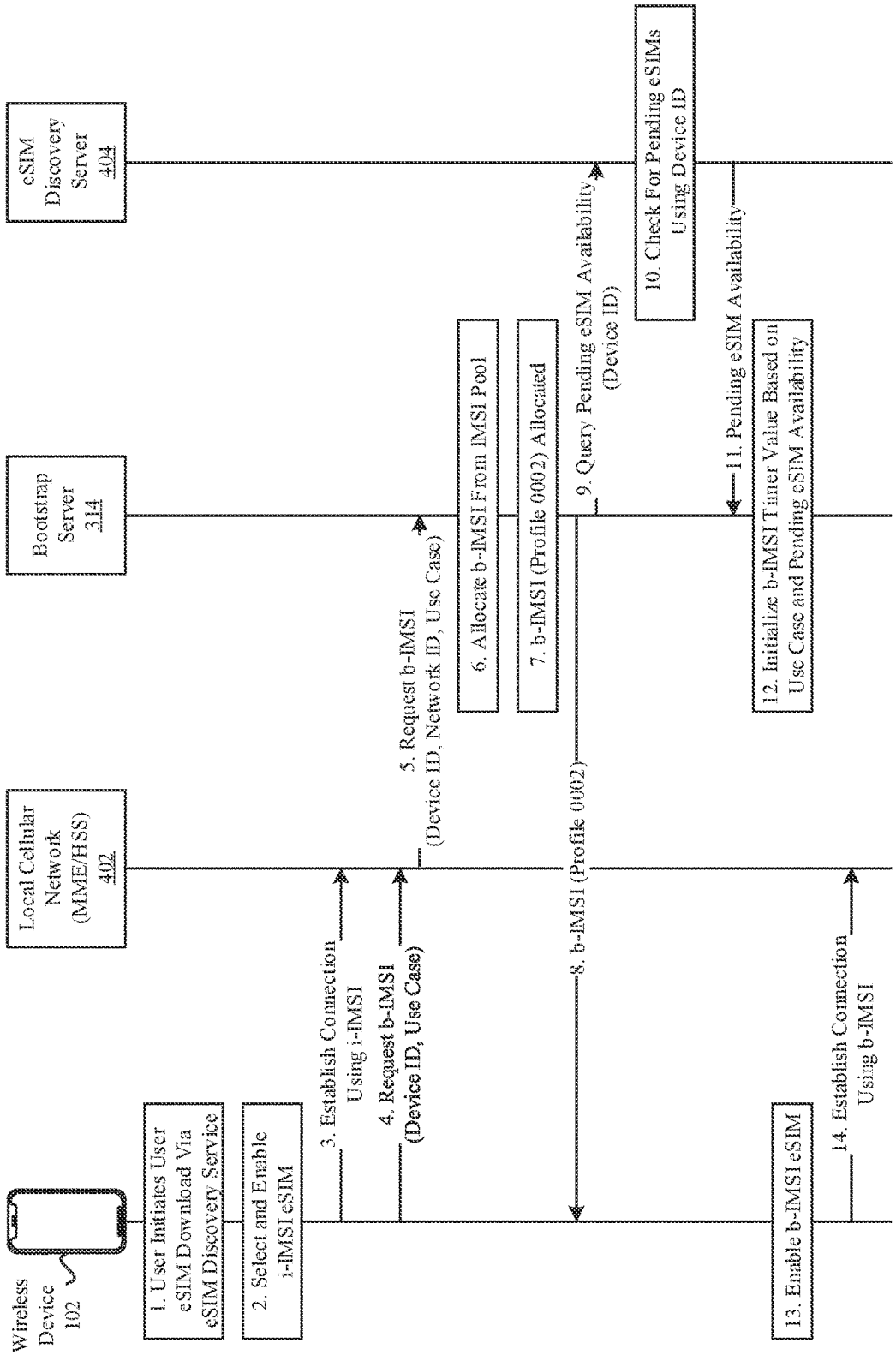
FIGS. 10A and 10B illustrate flow diagrams of an example of temporary bootstrap eSIM lease termination via a timer based release for a wireless device, according to some embodiments.
Figure 10B:
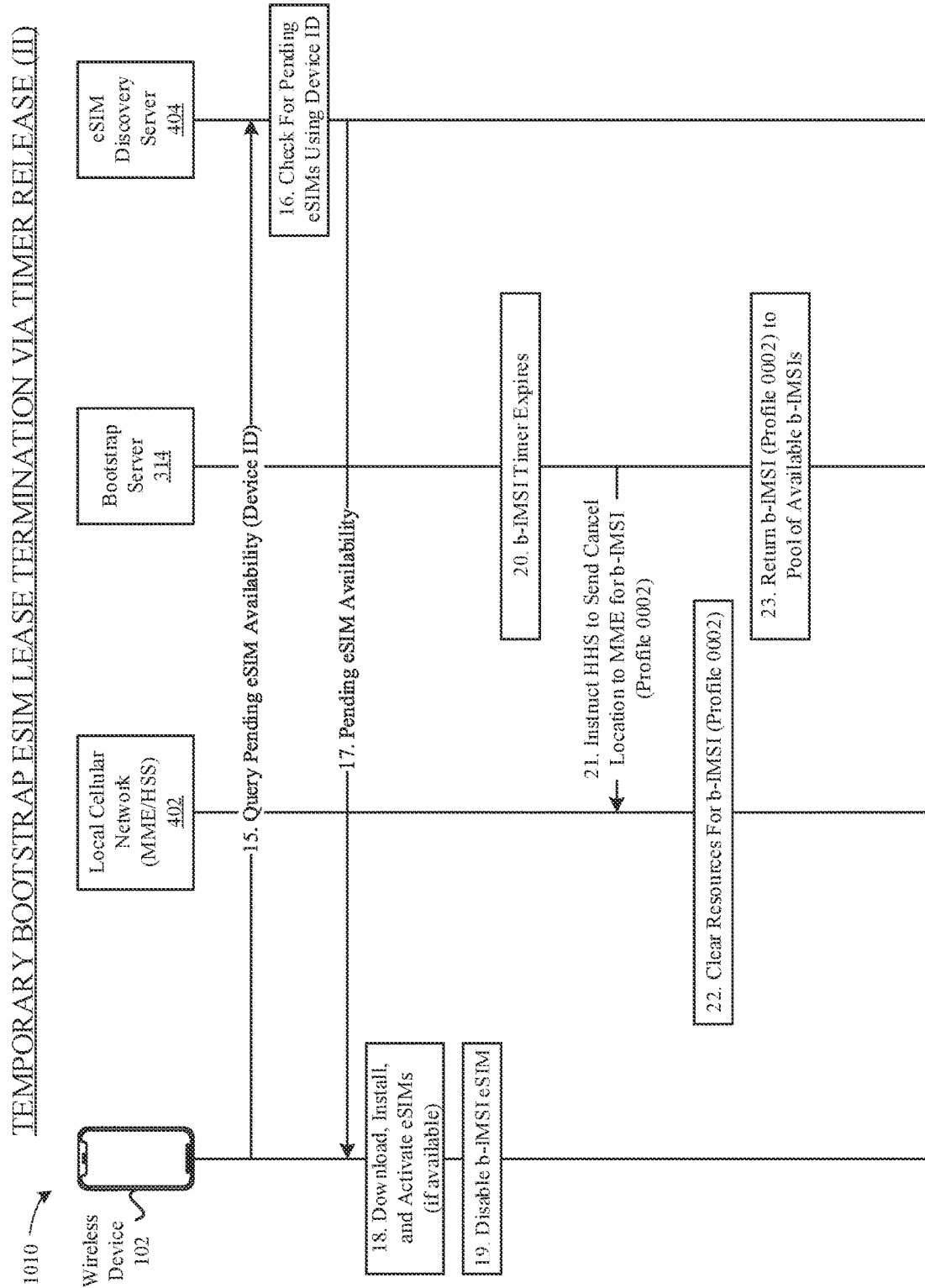

FIGS. 10A and 10B illustrates flow diagrams 1000, 1010 of an example of temporary assignment of a b-IMSI value for a bootstrap eSIM 208 to a wireless device 102, followed by release of the b-IMSI value after expiration of a timer to return the b-IMSI value to a pool of available b-IMSI values for allocation to wireless devices 102. The example of FIGS. 10A and 10B illustrates a wireless device 102 that seeks to use a bootstrap eSIM 208 to determine availability of pending user eSIMs 208 for subsequent download to the wireless device 102. A user of the wireless device 102 initiates a user eSIM 208 download procedure via an eSIM discovery service, e.g., provided by an eSIM discovery server 404. The wireless device 102 initially has no cellular (or non-cellular) wireless connectivity (or other wired connectivity) with which to poll the eSIM discovery server 404 and therefore seeks to use a bootstrap eSIM 208 to obtain a user eSIM 208. The wireless device 102 selects an i-IMSI value from a pool of available i-IMSI values for the wireless device 102 and configures a bootstrap eSIM 208 on an eUICC 108 of the wireless device 102 based on the selected i-IMSI value and associated profile parameters. The wireless device 102 establishes a connection with a local cellular network 402 using credentials of the bootstrap eSIM 208 configured with the i-IMSI value and sends a request to the local cellular network 402 for a b-IMSI value to be temporarily assigned to the wireless device 102. The request for the b-IMSI value includes a unique device ID value for the wireless device 102 and a use case type value indicating a reason for which the wireless device 102 requests allocation of the b-IMSI value. In the example of FIG. 10A, the use case type value can indicate the wireless device 102 intends to download a user eSIM 208 determined based on a query to an eSIM discovery server 404. The local cellular network 402 forwards the request (or a corresponding re-generated request) for the b-IMSI value to a bootstrap server 314 adding a network ID value, e.g., an MCC value with an MNC value, which can provide indirectly a geographic location for the first wireless device 102-A. The bootstrap server 314 allocates a b-IMSI value, from a pool of available b-IMSI values, to the wireless device 102A in accordance with a bootstrap selection rule obtained from a bootstrap rules service 406 (not shown). The selected b-IMSI value can be associated with a set of profile parameters for a particular bootstrap eSIM 208 (indicated as profile 0002 in FIG. 10A). The bootstrap server 314 returns the selected b-IMSI value (associated with bootstrap eSIM profile 0002) to the wireless device 102. The bootstrap server 314 also queries the eSIM discovery server 404 for any pending eSIMs 208 available for the wireless device 102 uniquely identified by the device ID value included in the b-IMSI request. The eSIM discovery server 404 can check for pending eSIMs 208 for the wireless device 102 using the device ID value and provide a response to the bootstrap server 314 indicating availability of any pending eSIMs 208 for the wireless device 102. In some embodiments, the bootstrap server 314 queries the eSIM discovery server 404 regarding pending eSIMs 208 for the wireless device 102 before allocating the b-IMSI value and accounts for the information regarding pending eSIMs available for the wireless device when selecting and allocating the b-IMSI value to the wireless device 102. The bootstrap server 314 can initialize a value for an expiration timer associated with the b-IMSI value allocated to the first wireless device 102 based on the response received from the eSIM discovery server 404. For example, when no pending eSIMs 208 are available for the wireless device 102, the bootstrap server 314 can set a value for the expiration timer below a low threshold value, e.g., less than one minute, as the wireless device 102 will not require use of a bootstrap eSIM configured with the b-IMSI value to obtain eSIMs 208 that are not available. Alternatively, when one or more pending eSIMs 208 are available for the wireless device 102, the bootstrap server 314 can set a value for the expiration timer above a variable optimized threshold value, which can be based on tasks to be performed using the bootstrap eSIM configured with the b-IMSI value, e.g., five minutes for an eSIM download or fifteen minutes for device activation and an eSIM download. The expiration timer can be set to allow the wireless device 102 sufficient time to perform a setup procedure, query an eSIM discovery server 404, retrieve available user eSIMs 208 from one or more MNO provisioning servers 116, or other scheduled tasks, which in some cases can be determined based on the use case type value provided to the bootstrap server 314 by the wireless device 102. The wireless device 102 configures the bootstrap eSIM 208 with the b-IMSI value and the associated profile parameters. After enabling the bootstrap eSIM 208, the wireless device 102 establishes a connection with the local cellular network 402 (or with another local cellular network 402) using credentials of the bootstrap eSIM configured with the b-IMSI value. The wireless device 102 sends a query to the eSIM discovery server 404 via the connection, the query including the unique device ID value for the wireless device 102, and the eSIM discovery server 404 checks for availability of pending user eSIMs 208 for the wireless device 102 based on the supplied device ID value. The eSIM discovery server 404 returns an indication of available pending user eSIMs 208 to the wireless device 102, which can download, install, and activate one or more of the pending user eSIMs 208 (when available) from associated MNO provisioning servers 116. When no pending user eSIMs 208 are available (or after downloading and installing one or more pending user eSIMs 208), the wireless device 102 disables the bootstrap eSIM 208 configured with b-IMSI value. Unlike the procedure illustrated in FIGS. 9A and 9B, the wireless device 102 does not send a delete notification message regarding the disablement of the bootstrap eSIM 208 to the bootstrap server 314 via the local cellular network 402. An expiration timer for the b-IMSI value, previously set by the bootstrap server 314 based on the query of the eSIM discovery server 404, expires, and the bootstrap server 314 sends an instruction to an HHS associated with the local cellular network 402 to send a message to the MME of the local cellular network 402 to cancel the location for the b-IMSI value (and associated profile 0002). The local cellular network 402 clears any residual assigned resources for the b-IMSI value associated with the bootstrap eSIM 208. The bootstrap server 314 then returns the b-IMSI value to the pool of b-IMSI values available for allocation to wireless devices 102.

Figure 11:
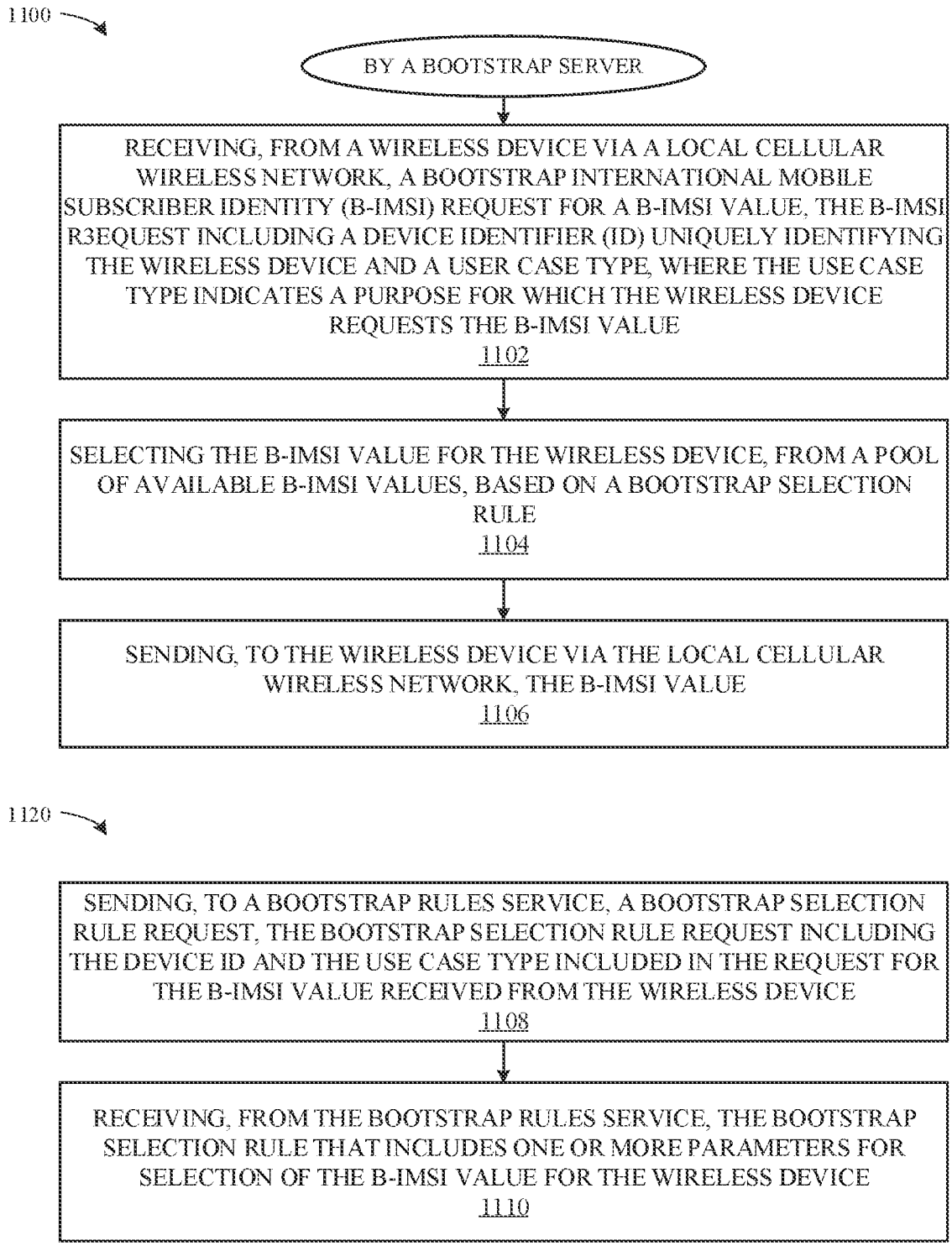
FIG. 11 illustrates flowcharts of an exemplary method for a bootstrap server to select and allocate a bootstrap IMSI (b-IMSI) value to a wireless device, according to some embodiments.

FIG. 11 illustrates flowcharts 1100, 1120 of an exemplary method for a bootstrap server 314 to select and allocate a b-IMSI value to a wireless device 102. At 1102, the bootstrap server 314 receives, from the wireless device 102 via a local cellular network 402, a b-IMSI request for a b-IMSI value, the b-IMSI request including a device identifier (ID) uniquely identifying the wireless device 102 and a use case type, where the use case type indicates a purpose for which the wireless device 102 requests the b-IMSI value. At 1104, the bootstrap server 314 selects the b-IMSI value for the wireless device 102, from a pool of available b-IMSI values, based on a bootstrap selection rule. At 1106, the bootstrap server 314 sends, to the wireless device 102 via the local cellular network 402, the b-IMSI value.

In some embodiments, the bootstrap server 314 obtains the bootstrap selection rule used for selection of the b-IMSI value from a bootstrap rules service 406. At 1108, the bootstrap server 314 sends, to a bootstrap rules service 406, a bootstrap selection rule request, where the bootstrap selection rule request includes the device ID and the use case type included in the request for the b-IMSI value received from the wireless device 102. At 1110, the bootstrap server 314 receives, from the bootstrap rules service 406, the bootstrap selection rule that includes one or more parameters for selection of the b-IMSI value for the wireless device 102.

In some embodiments, the one or more parameters for selection of the b-IMSI value includes an indication of an MNO 114 and/or a geographic area for which the b-IMSI value is valid. In some embodiments, the indication of the MNO 114 and/or the geographic area is based on a location value for the local cellular network 402 included in the bootstrap selection rule request. In some embodiments, the indication of the MNO 114 and/or the geographic area is based on sales channel data for the wireless device 102. In some embodiments, the indication of the MNO 114 and/or the geographic area is based on one or more eSIMs 208 pending delivery to the wireless device 102. In some embodiments, the one or more parameters of the bootstrap selection rule includes an expiration timer value indicating a maximum time duration for validity of the b-IMSI value selected for the wireless device 102, where the expiration timer value is based on the use case type. In some embodiments, the bootstrap server 314 is further configured to return the b-IMSI value to the pool of b-IMSI values for re-selection for other wireless devices 102 after expiration of a timer configured with the expiration timer value. In some embodiments, the use case type includes an indication of a wireless device 102 setup and configuration procedure. In some embodiments, the use case type includes a user eSIM 208 download from an MNO provisioning server 116 to the wireless device 102. In some embodiments, the use case type includes a query for availability of eSIMs 208 pending delivery to the wireless device 102. In some embodiments, the bootstrap server 314 is further configured to: i) receive, from the wireless device 102 via the local cellular network 402, a delete notification message indicating termination of use of the b-IMSI value by the wireless device 102, and ii) return the b-IMSI value to the pool of b-IMSI values for re-selection for other wireless devices 102 after receipt of the delete notification message from the wireless device 102. In some embodiments, the bootstrap server 314 is further configured to: i) return the b-IMSI value to the pool of b-IMSI values after expiration of a timer associated with assignment of the b-IMSI value to the wireless device 102 or after receipt of a delete notification message from the wireless device 102, ii) receive, from a second wireless device 102, a second b-IMSI request, the second b-IMSI request including a second device ID and a second use case type, iii) select the b-IMSI value for the second wireless device 102 from the pool of available b-IMSI values based on a second bootstrap selection rule, and iv) send, to the second wireless device 102, the b-IMSI value. In some embodiments, the bootstrap server 314 receives the second bootstrap selection rule from the bootstrap rules service 406 responsive to a second bootstrap selection rule request.

Figure 12:
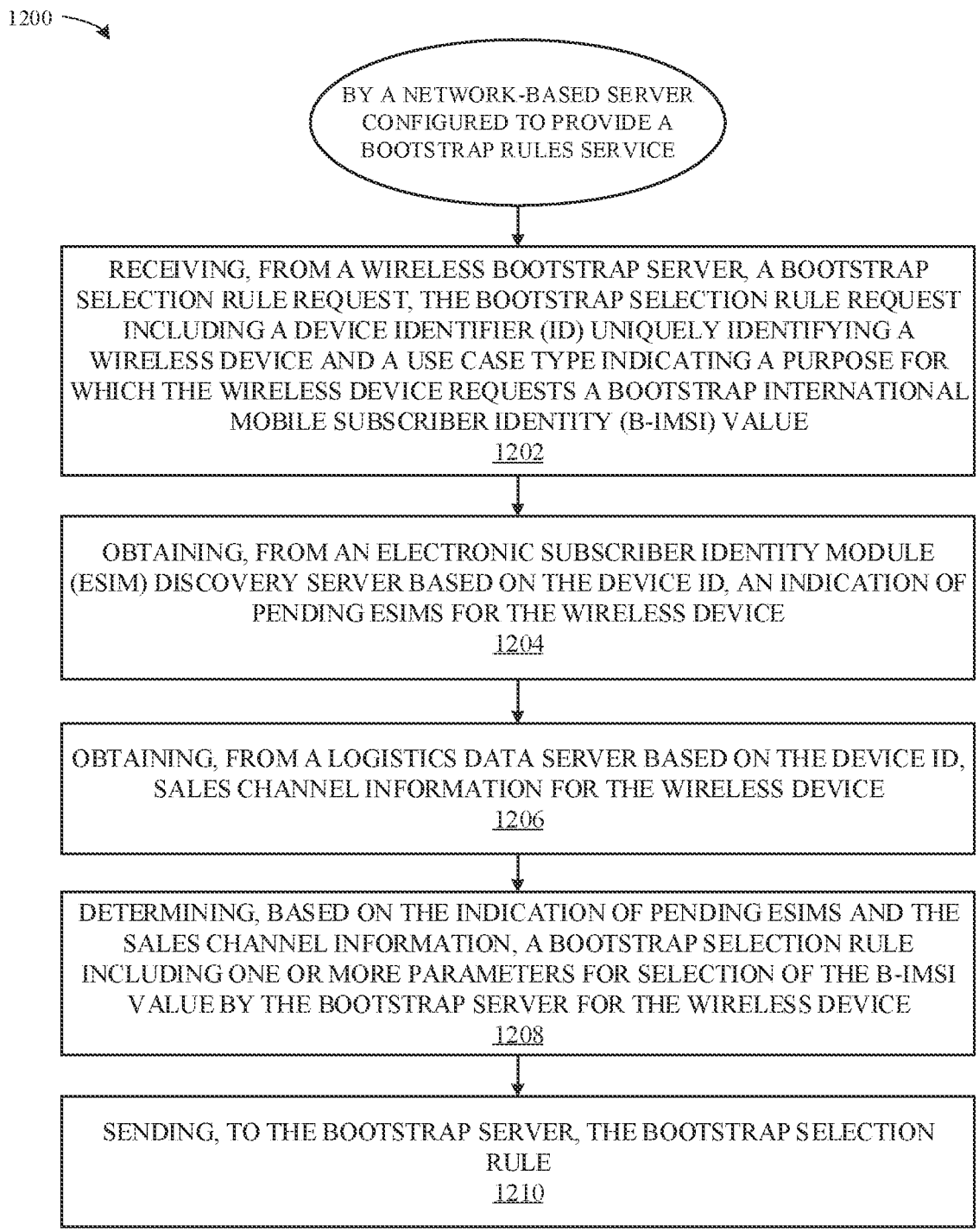
FIG. 12 illustrates a flowchart of an exemplary method for a network-based server configured to provide a bootstrap rules service to determine and provide a bootstrap selection rule to a bootstrap server for allocation of a b-IMSI value to a wireless device, according to some embodiments.

FIG. 12 illustrates a flowchart 1200 of an exemplary method, implemented by a network-based server configured to provide a bootstrap rules service, for determining a bootstrap selection rule for selection of a b-IMSI value for a wireless device 102. At 1202, the network-based server receives, from a bootstrap server 314, a bootstrap selection rule request, the bootstrap selection rule request including a device ID uniquely identifying a wireless device 102 and a use case type indicating a purpose for which the wireless device 102 requests a b-IMSI value. At 1204, the network-based server obtains, from an eSIM discovery server 404 based on the device ID, an indication of pending eSIMs 208 for the wireless device 102. At 1206, the network-based server obtains, from a logistics data server 408 based on the device ID, sales channel information for the wireless device 102. At 1208, the network-based server determines, based on the indication of pending eSIMs 208 and the sales channel information, a bootstrap selection rule including one or more parameters for selection of the b-IMSI value by the bootstrap server 314 for the wireless device 102. At 1210, the network-based server sends, to the bootstrap server 314, the bootstrap selection rule.

In some embodiments, the one or more parameters of the bootstrap selection rule include an indication of an MNO 114 and/or a geographic area for which the b-IMSI value is valid. In some embodiments, the one or more parameters of the bootstrap selection rule includes an expiration timer value indicating a maximum time duration for validity of the b-IMSI value selected for the wireless device 102, where the expiration timer value is based on the use case type. In some embodiments, the expiration timer value is based on an estimate of time required for the wireless device 102 to require use of the b-IMSI value in accordance with the use case type included in the bootstrap selection rule request.

FIG. 13 illustrates a flowchart 1300 of an exemplary method performed by a wireless device 102 to obtain and use a b-IMSI value to obtain a user eSIM 208. At 1302, the wireless device 102 establishes a first connection with a local cellular network 402 using credentials of a bootstrap eSIM 208 configured with an i-IMSI value selected from a pool of i-IMSI values stored in the wireless device 102. At 1304, the wireless device 102 sends, via the first connection to a bootstrap server 314, a b-IMSI request for a b-IMSI value, the b-IMSI request including a unique device ID for the wireless device 102 and a use case type, where the use case type indicates a purpose for which the wireless device 102 requests the b-IMSI value. At 1306, the wireless device 102 receives, via the first connection from the bootstrap server 314, the b-IMSI value. At 1308, the wireless device 102 reconfigures the bootstrap eSIM 208 using the b-IMSI value. At 1310, the wireless device 102 establishes a second connection with the local cellular network 402 or with another cellular wireless network using credentials of the bootstrap eSIM 208 configured with the b-IMSI value. At 1312, the wireless device 102 downloads from an MNO provisioning server 116 via the second connection a user eSIM 208. At 1314, the wireless device 102 installs and activates the user eSIM 208 on an eUICC 108 of the wireless device 102. At 1316, the wireless devices establishes a third connection with a cellular wireless network associated with the MNO 114 using credentials of the user eSIM 208.

In some embodiments, the wireless device 102 is further configured to, after receipt of the user eSIM 208 from the MNO provisioning server 116, i) cause the eUICC 108 to clear the b-IMSI value from the bootstrap eSIM 208, and ii) send, to the bootstrap server 314 via the third connection with the cellular wireless network, a delete notification message indicating termination of use of the b-IMSI value by the wireless device 102. In some embodiments, the delete notification message is signed by the eUICC 108 of the wireless device 102. In some embodiments, the wireless device 102 establishes the first connection with the local cellular network 402 using credentials of the bootstrap eSIM 208 configured with the i-IMSI value responsive to receipt of a quick response (QR) code scanned by the wireless device 102 to obtain the user eSIM 208. In some embodiments, the wireless device 102 establishes the first connection with the local cellular network 402 using credentials of the bootstrap eSIM 208 configured with the i-IMSI value responsive to a user query for eSIMs 208 pending for the wireless device 102. In some embodiments, the wireless device 102 establishes the first connection with the local cellular network 402 using credentials of the bootstrap eSIM 208 configured with the i-IMSI value during a device setup procedure to communicate with one or more OEM servers to configure operation of the wireless device 102.

Representative Device

Figure 14:
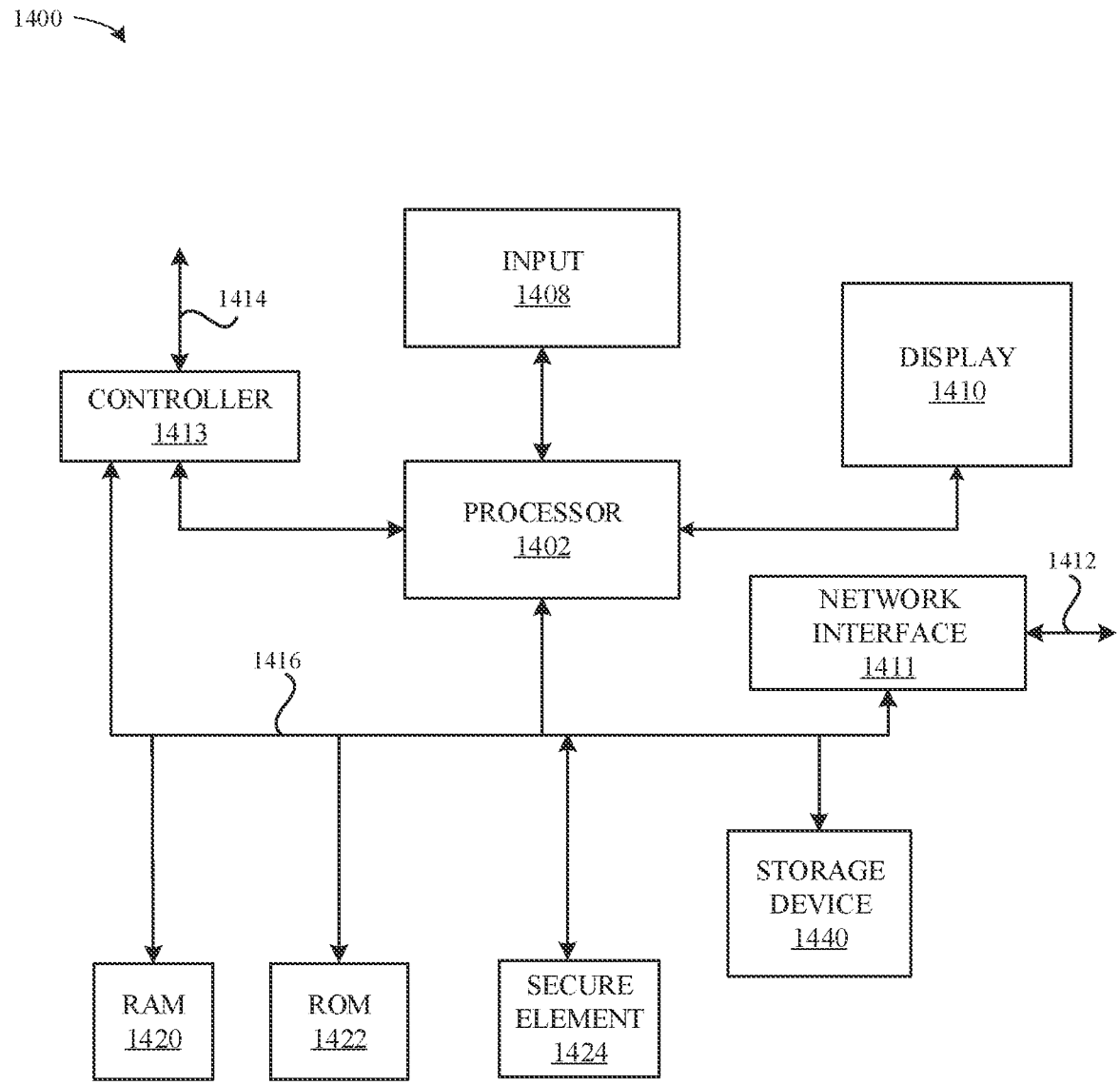
FIG. 14 illustrates a block diagram of exemplary elements of a wireless device, according to some embodiments.

FIG. 14 illustrates a detailed view of a representative computing device 1400 that can be used to implement various methods described herein, according to some embodiments. In particular, the detailed view illustrates various components that can be included in the wireless device 102. As shown in FIG. 14, the computing device 1400 can include a processor 1402 that represents a microprocessor or controller for controlling the overall operation of computing device 1400. The computing device 1400 can also include a user input device 1408 that allows a user of the computing device 1400 to interact with the computing device 1400. For example, the user input device 1408 can take a variety of forms, such as a button, keypad, dial, touch screen, audio input interface, visual/image capture input interface, input in the form of sensor data, etc. Still further, the computing device 1400 can include a display 1410 that can be controlled by the processor 1402 to display information to the user. A data bus 1416 can facilitate data transfer between at least a storage device 1440, the processor 1402, and a controller 1413. The controller 1413 can be used to interface with and control different equipment through an equipment control bus 1414. The computing device 1400 can also include a network/bus interface 1411 that communicatively couples to a data link 1412. In the case of a wireless connection, the network/bus interface 1411 can include a wireless transceiver.

The computing device 1400 also includes a storage device 1440, which can comprise a single disk or a plurality of disks (e.g., hard drives), and includes a storage management module that manages one or more partitions within the storage device 1440. In some embodiments, storage device 1440 can include flash memory, semiconductor (solid state) memory or the like. The computing device 1400 can also include a Random Access Memory (RAM) 1420 and a Read-Only Memory (ROM) 1422. The ROM 1422 can store programs, utilities or processes to be executed in a non-volatile manner. The RAM 1420 can provide volatile data storage, and stores instructions related to the operation of the computing device 1400. The computing device 1400 can further include a secure element (SE) 1424, which can represent secure storage for cellular wireless system access by the wireless device 102, such as an eUICC 108 on which to store one or more eSIMs 208 and/or a UICC 118 on which to store a SIM profile.

Wireless Terminology

In accordance with various embodiments described herein, the terms "wireless communication device," "wireless device," "mobile wireless device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High-Speed Packet Access (HSPA+) network or a Code Division Multiple Access (CDMA) 2000 Evolution-Data Only (EV-DO) network, when LTE and LTE-A networks are otherwise unavailable.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

Regarding the present disclosure, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A bootstrap server configured for selection of a bootstrap international mobile subscriber identity (b-IMSI) value for a wireless device, the bootstrap server comprising:
one or more processors communicatively coupled to a memory storing instructions that, when executed by the one or more processors, configure the bootstrap server to:
receive, from the wireless device via a local cellular wireless network, a b-IMSI request for a b-IMSI value, the b-IMSI request including a device identifier (ID) uniquely identifying the wireless device and a use case type, where the use case type indicates a purpose for which the wireless device requests the b-IMSI value;
select the b-IMSI value for the wireless device, from a pool of available b-IMSI values, based on a bootstrap selection rule; and
send, to the wireless device via the local cellular wireless network, the b-IMSI value.

2. The bootstrap server of claim 1, wherein the bootstrap server is further configured to:
send, to a bootstrap rules service, a bootstrap selection rule request, the bootstrap selection rule request including the device ID and the use case type; and
receive, from the bootstrap rules service, the bootstrap selection rule that includes one or more parameters for selection of the b-IMSI value for the wireless device.

3. The bootstrap server of claim 2, wherein the one or more parameters for selection of the b-IMSI value includes an indication of a mobile network operator (MNO) and/or a geographic area for which the b-IMSI value is valid.

4. The bootstrap server of claim 3, wherein the indication of the MNO and/or the geographic area is based on one or more of:
a location value for the local cellular wireless network included in the bootstrap selection rule request;
sales channel data for the wireless device; or
one or more electronic subscriber identity modules (eSIMs) pending delivery to the wireless device.

5. The bootstrap server of claim 2, wherein the one or more parameters for selection of the b-IMSI value includes an expiration timer value indicating a maximum time duration for validity of the b-IMSI value selected for the wireless device, where the expiration timer value is based on the use case type.

6. The bootstrap server of claim 5, wherein the bootstrap server is further configured to:
return the b-IMSI value to the pool of available b-IMSI values for re-selection for other wireless devices after expiration of a timer configured with the expiration timer value.

7. The bootstrap server of claim 1, wherein the use case type comprises an indication of a wireless device setup and configuration procedure.

8. The bootstrap server of claim 1, wherein the use case type comprises a user electronic subscriber identity module (eSIM) download from a mobile network operator (MNO) provisioning server to the wireless device.

9. The bootstrap server of claim 1, wherein the use case type comprises a query for availability of electronic subscriber identity modules (eSIMs) pending delivery to the wireless device.

10. The bootstrap server of claim 1, wherein the bootstrap server is further configured to:
receive, from the wireless device via the local cellular wireless network, a delete notification message indicating termination of use of the b-IMSI value by the wireless device; and
return the b-IMSI value to the pool of available b-IMSI values for re-selection for other wireless devices after receipt of the delete notification message from the wireless device.

11. The bootstrap server of claim 1, wherein the bootstrap server is further configured to:
return the b-IMSI value to the pool of b-IMSI values after expiration of a timer associated with assignment of the b-IMSI value to the wireless device or after receipt of a delete notification message from the wireless device;
receive, from a second wireless device, a second b-IMSI request, the second b-IMSI request including a second device ID and a second use case type;
select the b-IMSI value for the second wireless device from the pool of available b-IMSI values based on a second bootstrap selection rule; and
send, to the second wireless device, the b-IMSI value.

12. A network-based server configured to provide a bootstrap rules service, the network-based server comprising:
one or more processors communicatively coupled to a memory storing instructions that, when executed by the one or more processors, configure the network-based server to:
receive, from a bootstrap server, a bootstrap selection rule request, the bootstrap selection rule request including a device identifier (ID) uniquely identifying a wireless device and a use case type indicating a purpose for which the wireless device requests a bootstrap international mobile subscriber identity (b-IMSI) value;
obtain, from an electronic subscriber identity module (eSIM) discovery server based on the device ID, an indication of pending eSIMs for the wireless device;
obtain, from a logistics data server based on the device ID, sales channel information for the wireless device;
determine, based on the indication of pending eSIMs and the sales channel information, a bootstrap selection rule including one or more parameters for selection of the b-IMSI value by the bootstrap server for the wireless device; and
send, to the bootstrap server, the bootstrap selection rule.

13. The network-based server of claim 12, wherein the one or more parameters of the bootstrap selection rule include an indication of a mobile network operator (MNO) and/or a geographic area for which the b-IMSI value is valid.

14. The network-based server of claim 12, wherein the one or more parameters of the bootstrap selection rule includes an expiration timer value indicating a maximum time duration for validity of the b-IMSI value selected for the wireless device, where the expiration timer value is based on the use case type.

15. The network-based server of claim 14, wherein the expiration timer value is based on an estimate of time required for the wireless device to require use of the b-IMSI value in accordance with the use case type included in the bootstrap selection rule request.

16. A wireless device comprising:
wireless circuitry comprising one or more antennas;
an embedded universal integrated circuit card (eUICC) storing a bootstrap electronic subscriber identity module (eSIM); and
one or more processors communicatively coupled to the wireless circuitry, to the eUICC, and to a memory storing instructions that configure the wireless device to:
establish a first connection with a local cellular wireless network using credentials of the bootstrap eSIM configured with an initial international mobile subscriber identity (i-IMSI) value selected from a pool of i-IMSI values stored in the wireless device;
send, via the first connection to a bootstrap server, a bootstrap IMSI (b-IMSI) request for a b-IMSI value, the b-IMSI request including a unique device identifier (ID) for the wireless device and a use case type, where the use case type indicates a purpose for which the wireless device requests the b-IMSI value;
receive, via the first connection from the bootstrap server, the b-IMSI value;
reconfigure the bootstrap eSIM using the b-IMSI value;
establish a second connection with the local cellular wireless network or with another cellular wireless network using credentials of the bootstrap eSIM configured with the b-IMSI value;
download, from a mobile network operator (MNO) provisioning server via the second connection, a user eSIM;
install and activate the user eSIM on the eUICC; and
establish a third connection with a cellular wireless network associated with the MNO using credentials of the user eSIM.

17. The wireless device of claim 16, wherein the wireless device is further configured to:
after receipt of the user eSIM from the MNO provisioning server:
cause the eUICC to clear the b-IMSI value from the bootstrap eSIM; and
send, to the bootstrap server via the third connection with the cellular wireless network, a delete notification message indicating termination of use of the b-IMSI value by the wireless device.

18. The wireless device of claim 16, wherein the wireless device establishes the first connection with the local cellular wireless network using credentials of the bootstrap eSIM configured with the i-IMSI value responsive to receipt of a quick response (QR) code scanned by the wireless device to obtain the user eSIM.

19. The wireless device of claim 16, wherein the wireless device establishes the first connection with the local cellular wireless network using credentials of the bootstrap eSIM configured with the i-IMSI value responsive to a user query for eSIMs pending for the wireless device.

20. The wireless device of claim 16, wherein the wireless device establishes the first connection with the local cellular wireless network using credentials of the bootstrap eSIM configured with the i-IMSI value during a device setup procedure to communicate with one or more original equipment manufacturer (OEM) servers to configure operation of the wireless device.

* * * * *